(12) United States Patent
Pell et al.

(10) Patent No.: US 8,430,139 B2
(45) Date of Patent: Apr. 30, 2013

(54) AUTOMATED REFILLING CONNECTION FOR A LIQUID MATERIAL CONTAINER OF AN APPLICATOR

(75) Inventors: David Pell, Jackson, MN (US); John Peterson, Jackson, MN (US)

(73) Assignee: AGCO Corporation, Duluth, GA (US)

(*) Notice: Subject to any disclaimer, the term of this patent is extended or adjusted under 35 U.S.C. 154(b) by 700 days.

(21) Appl. No.: 12/636,448

(22) Filed: Dec. 11, 2009

(65) Prior Publication Data
US 2011/0139302 A1    Jun. 16, 2011

(51) Int. Cl.
*B65B 3/04* (2006.01)
*B65B 1/04* (2006.01)
*F16L 37/28* (2006.01)

(52) U.S. Cl.
USPC ........... 141/346; 141/231; 141/351; 251/149; 251/149.1

(58) Field of Classification Search ............ 141/231, 141/351, 346, 347; 251/149, 149.1, 149.2, 251/149.3, 149.4, 149.5, 149.6, 149.7, 149.8, 251/149.9
See application file for complete search history.

(56) References Cited

U.S. PATENT DOCUMENTS

| | | | | |
|---|---|---|---|---|
| 2,733,079 A * | 1/1956 | Worlidge | ............... | 137/614.03 |
| 3,473,569 A * | 10/1969 | Murray et al. | ........... | 137/614.06 |
| 3,809,122 A * | 5/1974 | Berg | ........................ | 137/614.06 |
| 3,976,100 A * | 8/1976 | Souslin | ..................... | 137/614.03 |
| 4,540,144 A * | 9/1985 | Perrella | ..................... | 244/135 A |
| 5,048,577 A * | 9/1991 | Kuusisto | ...................... | 141/293 |
| 5,810,292 A * | 9/1998 | Garcia et al. | ............. | 244/135 A |
| 7,503,510 B2 * | 3/2009 | Vickers et al. | .................. | 239/69 |
| 8,186,393 B2 * | 5/2012 | Huegerich et al. | ........... | 141/294 |

* cited by examiner

*Primary Examiner* — Timothy L Maust
*Assistant Examiner* — Robert Bell, III
(74) *Attorney, Agent, or Firm* — Hovey Williams LLP

(57) ABSTRACT

An agricultural liquid material application system broadly includes an agricultural applicator and a fluid-transferring connection assembly. The connection assembly includes complemental fluid connectors associated with a liquid material source and the applicator. The connection assembly includes a valve operably coupled to a corresponding one of the fluid connectors so as to be automatically shifted out of a closed position when the connectors are in sealing engagement with one another and the connection assembly is in a fluid transfer configuration.

19 Claims, 15 Drawing Sheets

AUTOMATED REFILLING CONNECTION FOR A LIQUID MATERIAL CONTAINER OF AN APPLICATOR

BACKGROUND

1. Field

The present invention relates generally to a connector assembly to transfer materials. More specifically, embodiments of the present invention concern a material application system including an applicator and supply station that provide a connector assembly to transfer liquid between the applicator and supply station.

2. Discussion of Prior Art

Releasable fluid connectors have long been used for transferring large volumes of liquid chemicals, such as fertilizer or fuel. Some conventional fluid coupler assemblies are designed to transfer hazardous liquid and can be selectively coupled or decoupled while restricting liquid from leaking from the connection. Specifically, it is known in the art to provide a "drip-less" connection with a pair of mating couplers that each include an integral valve to restrict inadvertent fluid leakage when the couplers are coupled or decoupled.

Agricultural applicators are known in the art for applying liquid onto a crop field. Such applicators carry a liquid container with a limited amount of liquid, and the container is typically replenished from a supply station. A conventional applicator supply station includes a supply line and a storage container that feeds the supply line. The applicator container is refilled by manually positioning the supply line into fluid communication with the applicator container and pumping liquid from the storage container.

Prior art fluid connectors are deficient and suffer from certain limitations. For instance, conventional "drip-less" couplers include a valve that is opened by manual actuation of a corresponding valve handle. Furthermore, to open or close the passage formed by a mated pair of such couplers, an operator must manually open or close both of the valves. So called "drip-less" couplers may also permit inadvertent liquid spillage during fluid transfer or during coupling or decoupling of the couplers.

Conventional applicators and applicator supply stations are also deficient because the refilling process involves manual positioning of the supply line so that the supply line can fluidly communicate with the applicator container. Such conventional manual coupling and decoupling of an applicator and supply station can result in inadvertent and undesirable liquid spillage or contamination of the liquid. Furthermore, inadvertent spillage can cause the operator to become exposed to the transferred liquid.

SUMMARY

The following brief summary is provided to indicate the nature of the subject matter disclosed herein. While certain aspects of the present invention are described below, the summary is not intended to limit the scope of the present invention.

Embodiments of the present invention provide a material application system and fluid connector assembly that do not suffer from the problems and limitations of the prior art application systems and connectors set forth above.

A first aspect of the present invention concerns an agricultural liquid material application system that broadly includes a mobile agricultural applicator and a fluid-transferring connection assembly. The mobile agricultural applicator includes a chassis and a liquid material applicator tank supported on the chassis. The fluid-transferring connection assembly is operable to selectively define a fluid passage that intercommunicates the applicator tank and a liquid material source when the connection assembly is in a fluid transfer configuration. The fluid-transferring connection assembly includes a pair of complemental fluid connectors, a first one of which is configured for association with the liquid material source and a second one of which is associated with the applicator. The fluid connectors are moveable into and out of sealing engagement to restrict fluid from leaking out of the connection assembly when in the fluid transfer configuration. The connection assembly includes at least one shiftable valve yieldably biased into a closed position in which flow through the fluid passage is prevented. The valve is operably coupled to a corresponding one of the fluid connectors so as to be automatically shifted out of the closed position when the connectors are in sealing engagement with one another and the connection assembly is in the fluid transfer configuration.

A second aspect of the present invention concerns a mobile agricultural applicator for use with a material supply station including a liquid material storage tank and a station fluid connector fluidly coupled to the storage tank. The mobile agricultural applicator broadly includes a chassis, a liquid material applicator tank supported on the chassis, an applicator fluid connector, and an applicator valve. The applicator fluid connector is fluidly coupled to the applicator tank and is configured to sealingly engage the station fluid connector and thereby define a fluid passage between the tanks. The applicator fluid connector is moveable relative to the station fluid connector as the applicator is moved relative to the supply station. The applicator valve is yieldably biased into a closed position in which flow through the fluid passage is prevented. The valve is operably coupled to the applicator fluid connector so as to be automatically shifted out of the closed position when the connectors are in sealing engagement with one another and the applicator fluid connector is moved toward the station.

A third aspect of the present invention concerns a fluid-transferring connection assembly for fluid transfer between liquid material tanks of a mobile agricultural applicator and a liquid material supply station, with the connection assembly operable to selectively intercommunicate the tanks when the assembly is in a fluid transfer configuration. The fluid-transferring connection assembly broadly includes a pair of complemental fluid connectors and a drive. The pair of complemental fluid connectors is operable to selectively define a fluid passage that fluidly communicates the tanks in the fluid transfer configuration, a first one of which is configured for association with the liquid material supply station and a second one of which is configured for association with the applicator. The fluid connectors are moveable into and out of sealing engagement to restrict fluid from leaking out of the connection assembly when in the fluid transfer configuration. The connection assembly includes at least one shiftable valve yieldably biased into a closed position in which flow through the fluid passage is prevented. The drive interconnects a corresponding one of the fluid connectors and the valve. The corresponding one of the fluid connectors is shiftable into and out of a valve-closing position, with the fluid connectors being in sealing engagement and relatively fixed to one another when the corresponding one of the fluid connectors is out of the valve-closing position. The drive automatically shifts the valve into and out of the closed position in response to shifting movement of the corresponding one of the fluid connectors into and out of the valve-closing position.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a rear perspective of a liquid material application system constructed in accordance with a preferred embodiment of the present invention and including a dirigible agricultural applicator and a mobile liquid supply station;

FIG. 2 is a fragmentary front perspective of the application system depicted in FIG. 1, showing a telescopic probe assembly and male fluid connector assembly of the applicator and a female fluid connector assembly and connector support assembly of the supply station, with the connector assemblies and support assembly cooperatively providing a fluid-transferring connection assembly, and showing the connection assembly shifted into a fluid transfer configuration where the connectors are sealingly engaged and permit fluid flow between the applicator and supply station;

Figure 4:
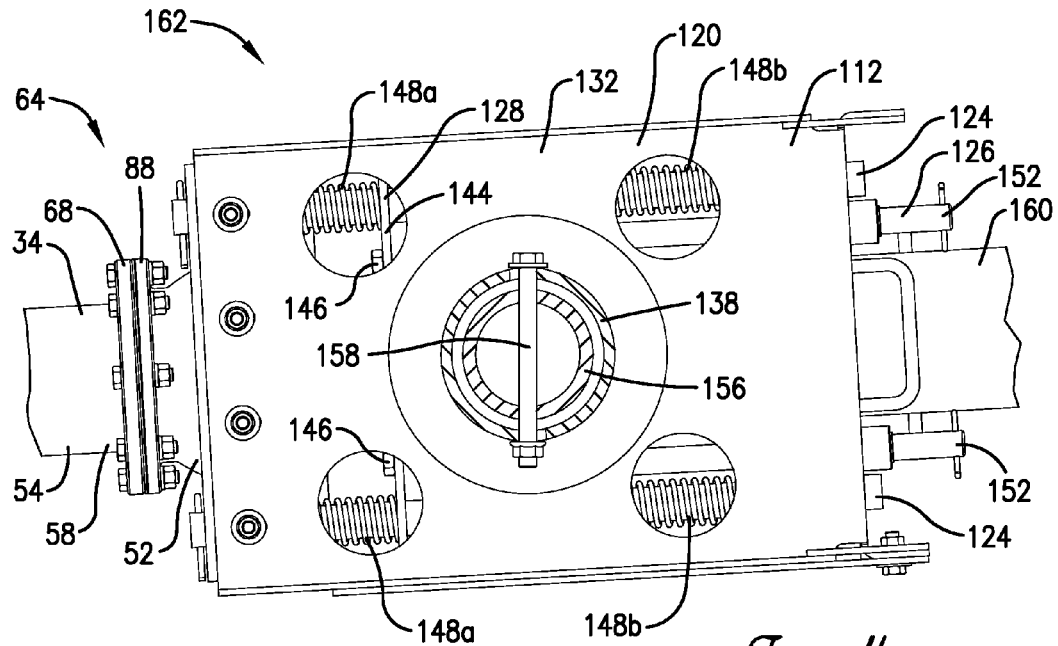
FIG. 4 is a cross section taken along line 4-4 in FIG. 3, showing a frame and frame mount of the support assembly removably and adjustably bolted to each other at a pivot joint, with the frame being in a normal upright position and the pivot joint permitting limited pivotal movement of the frame relative to the frame mount about an upright axis and a lateral axis.
Figure 5:
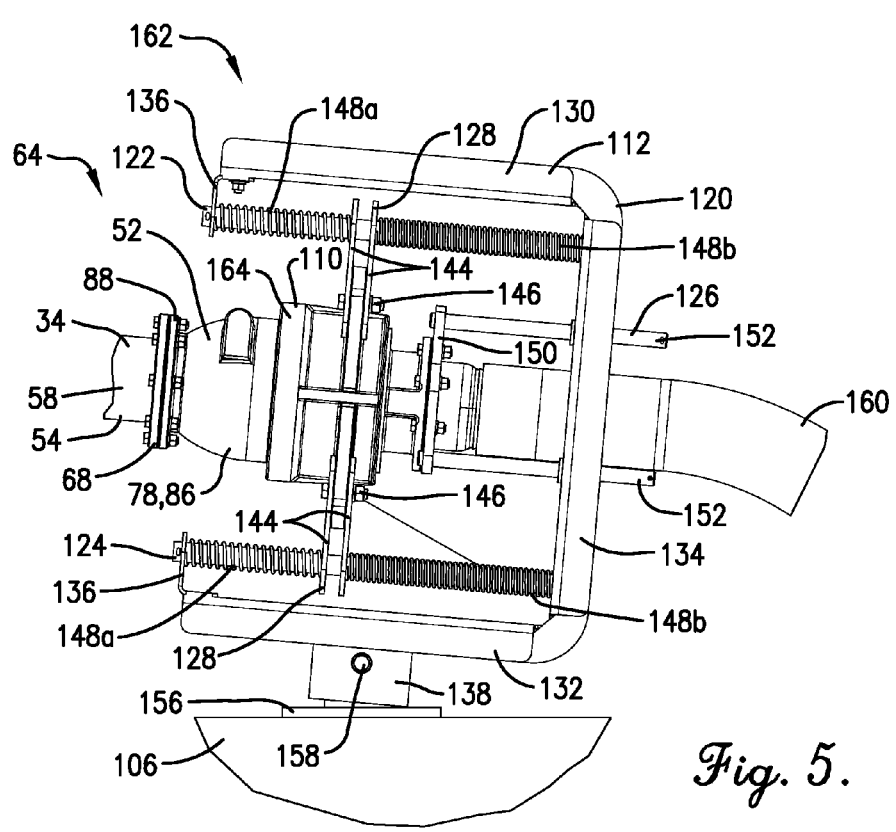
FIG. 5 is a fragmentary side elevation of the application system depicted in FIGS. 1-4, showing the frame pivoted relative to the frame mount from the normal upright position about the lateral axis.
Figure 6:
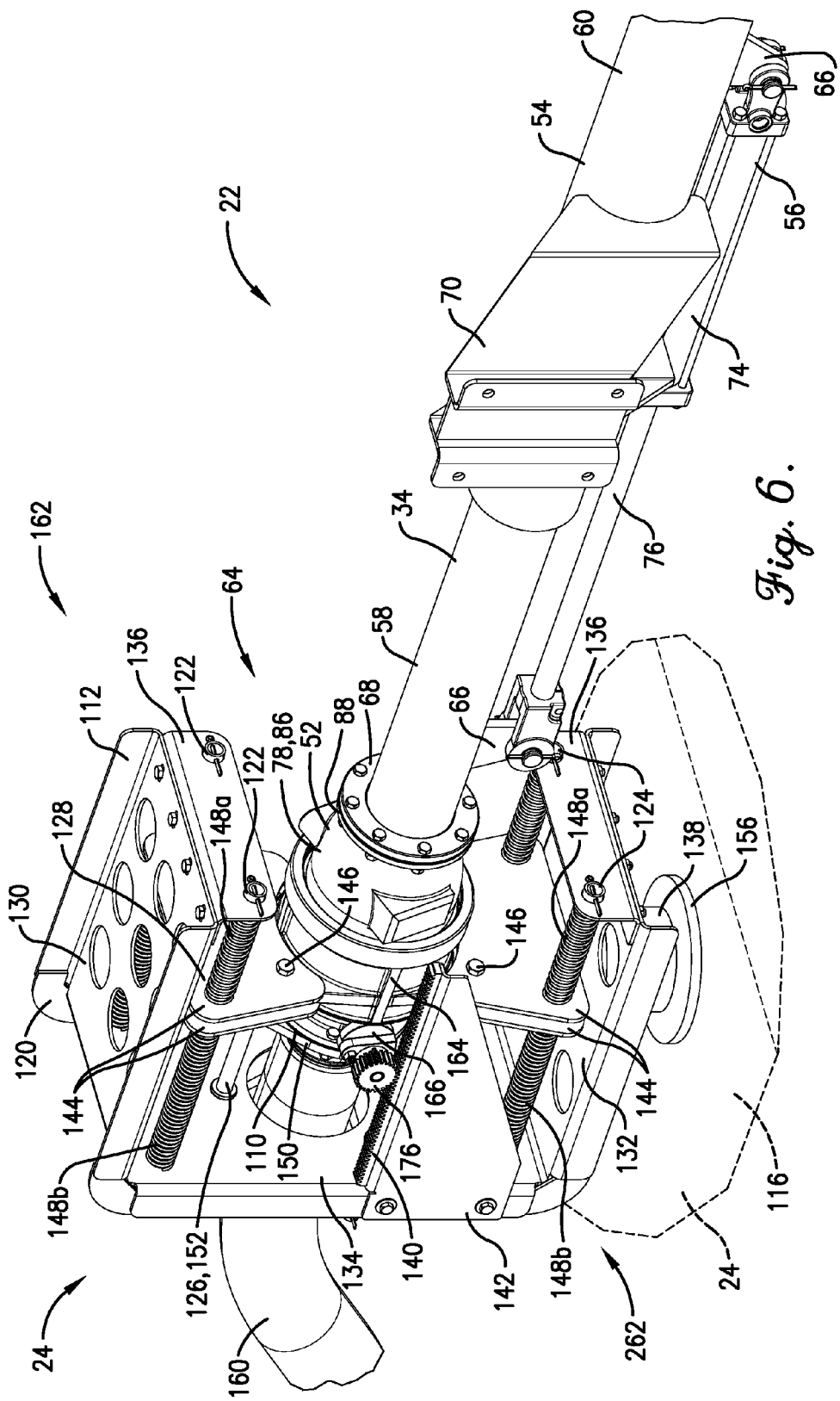
Figure 7:
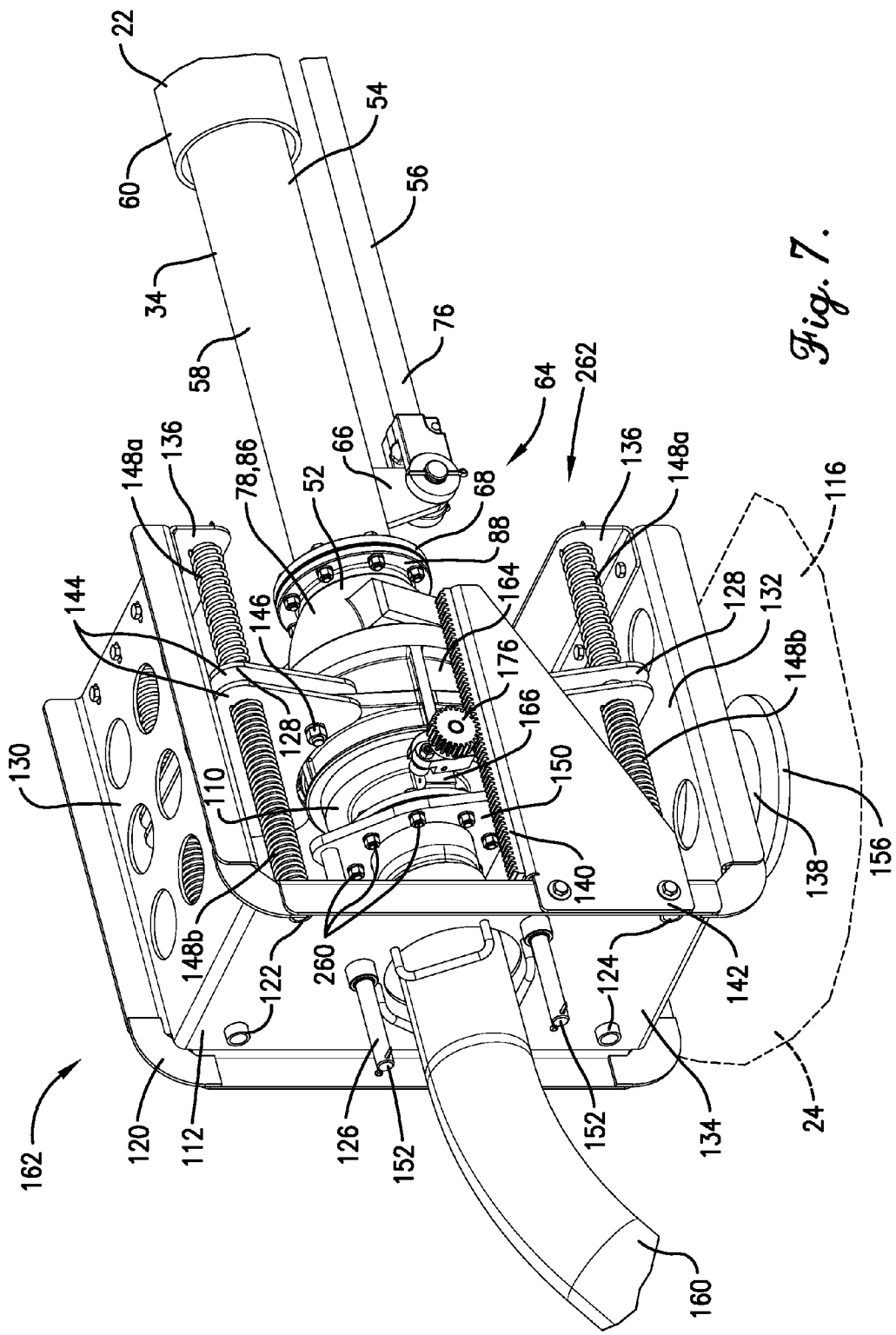
Figure 8:
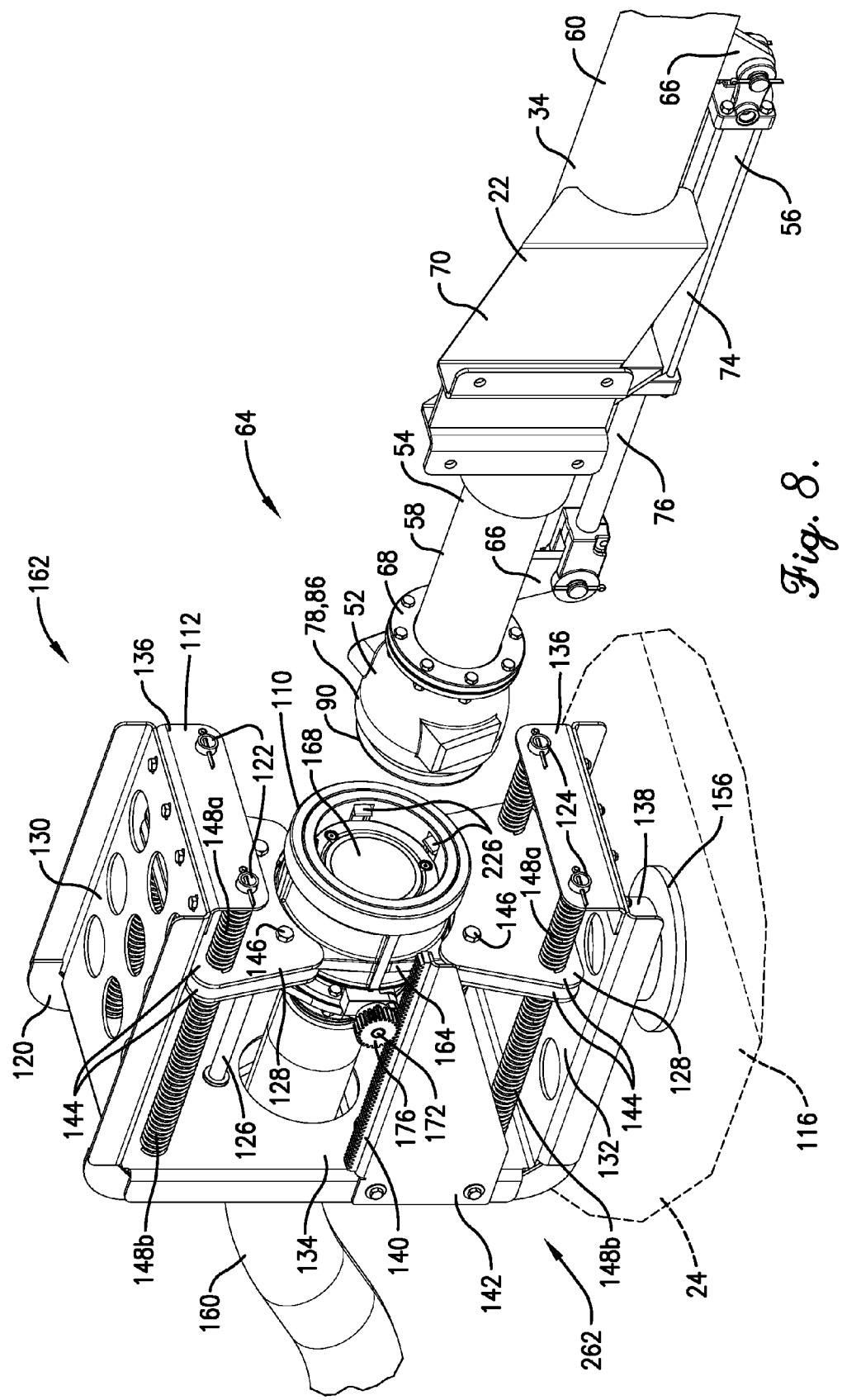
Figure 9:
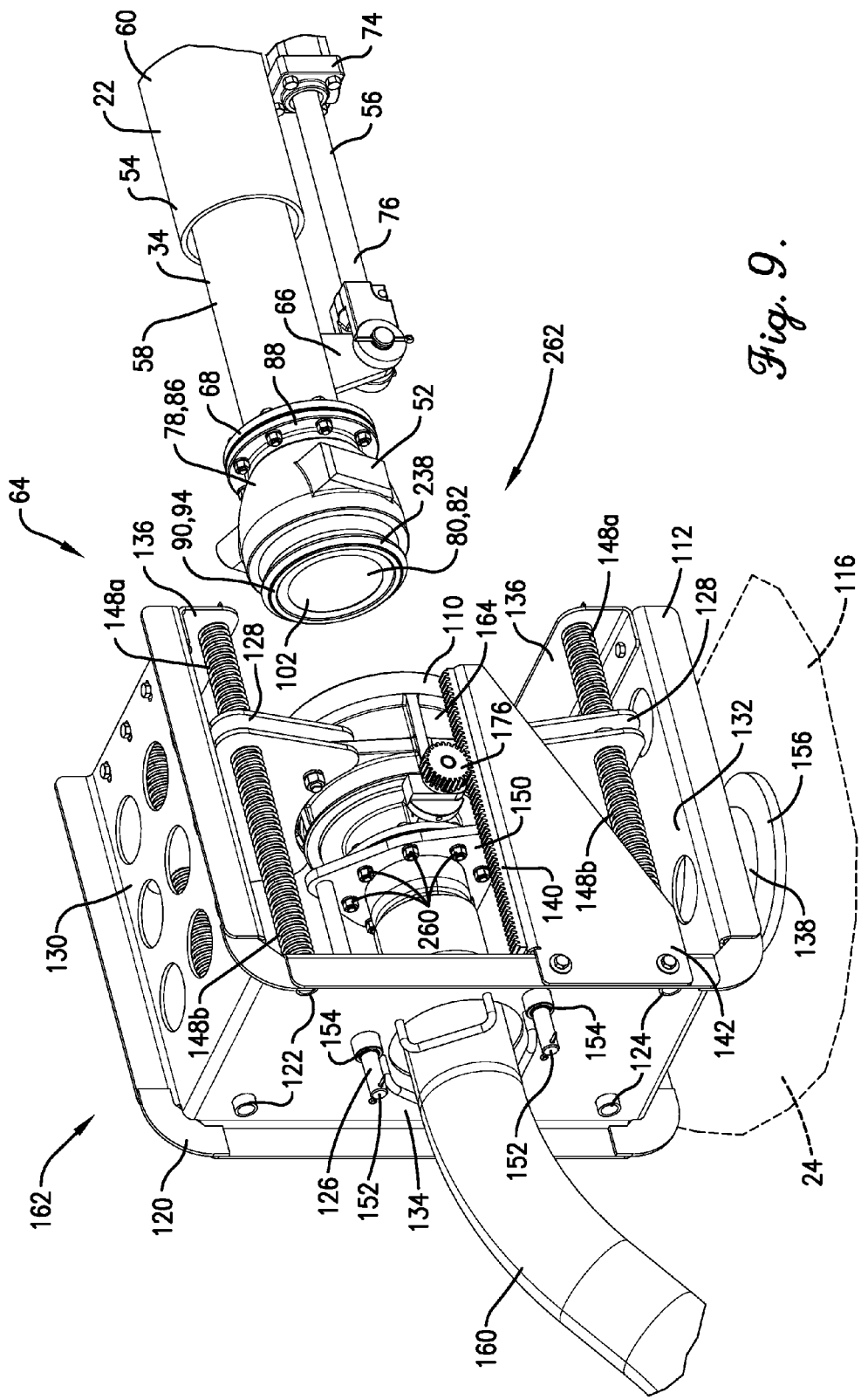
Figure 10:
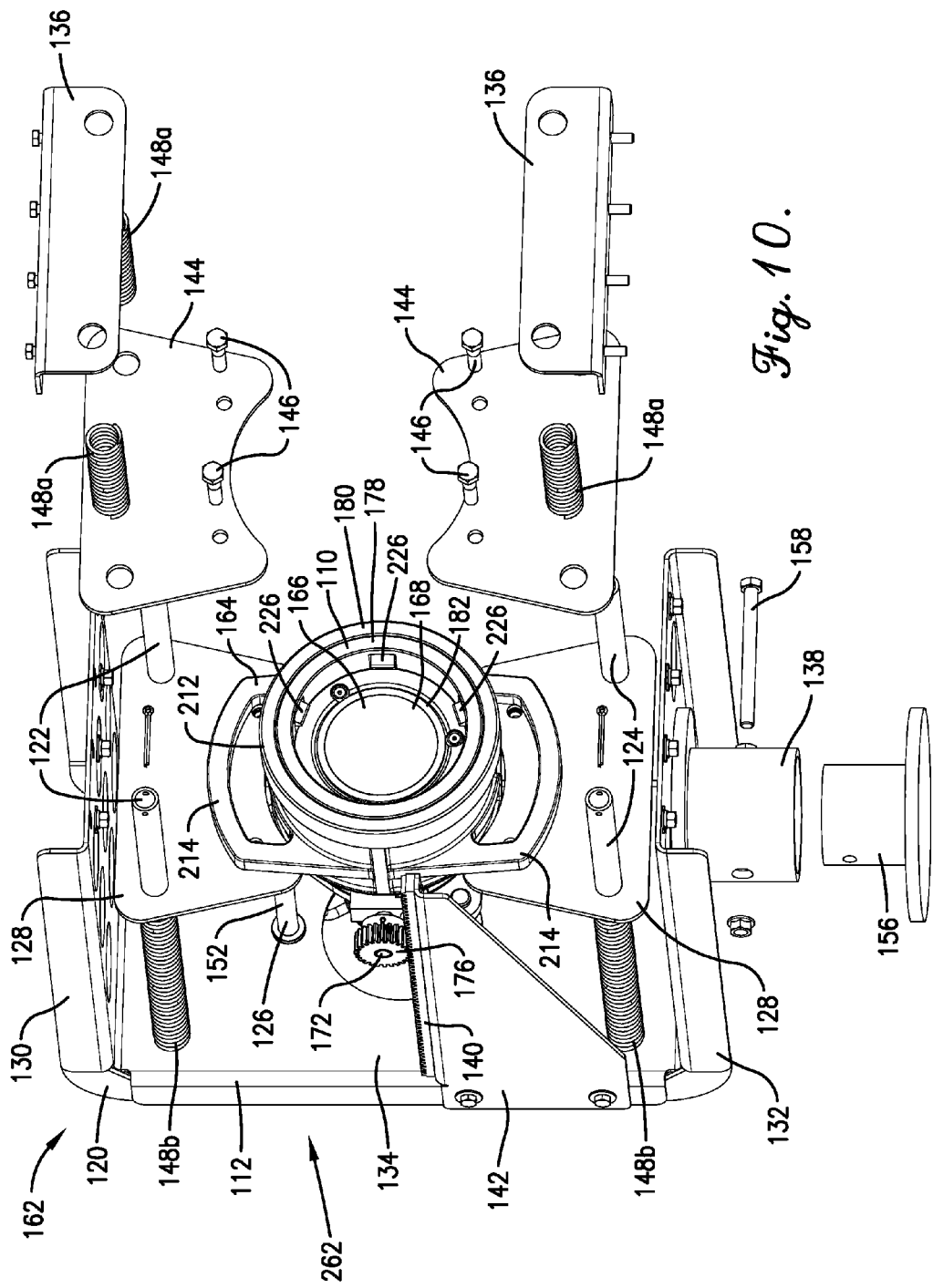
Figure 11:
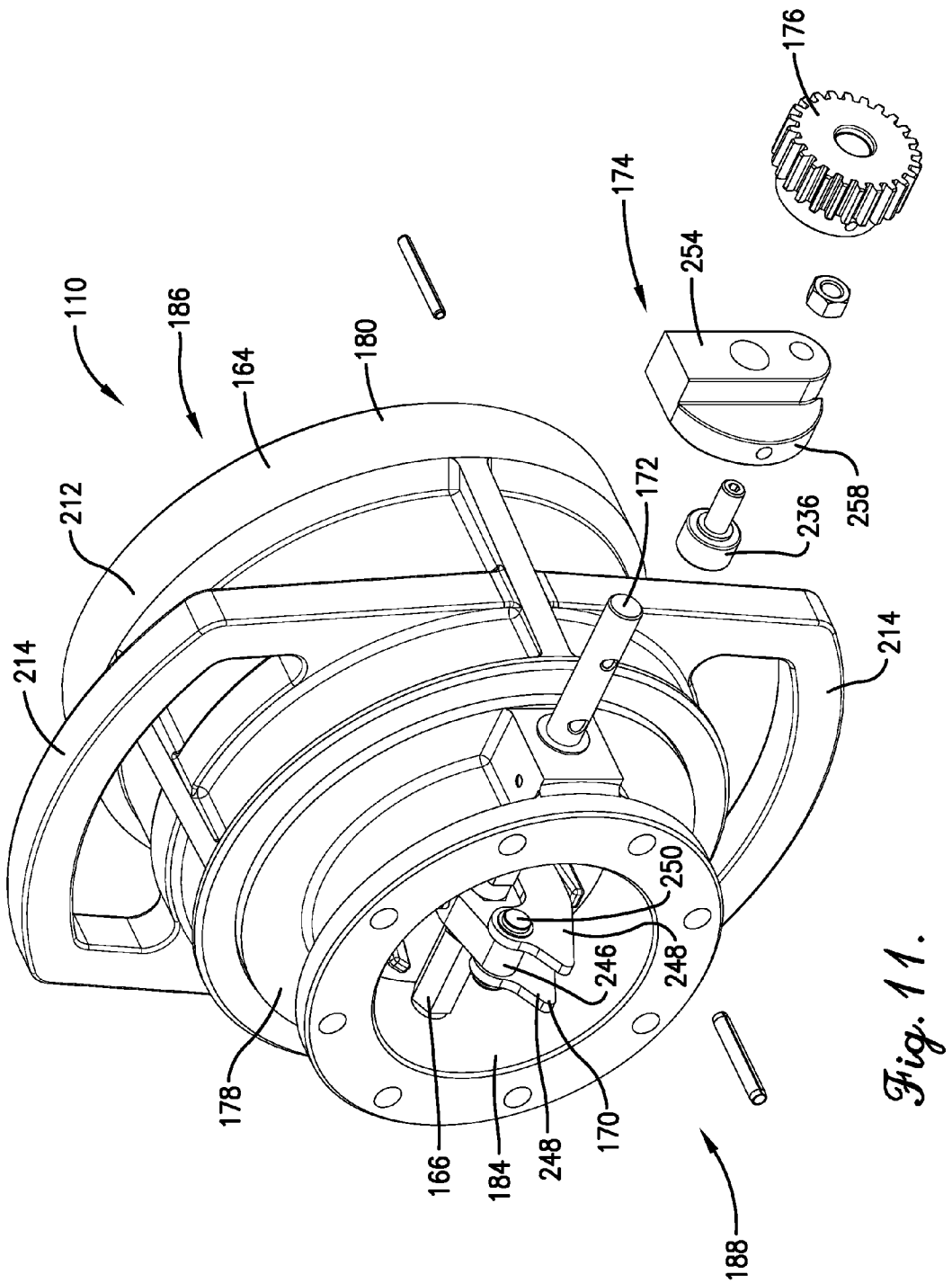
Figure 12:
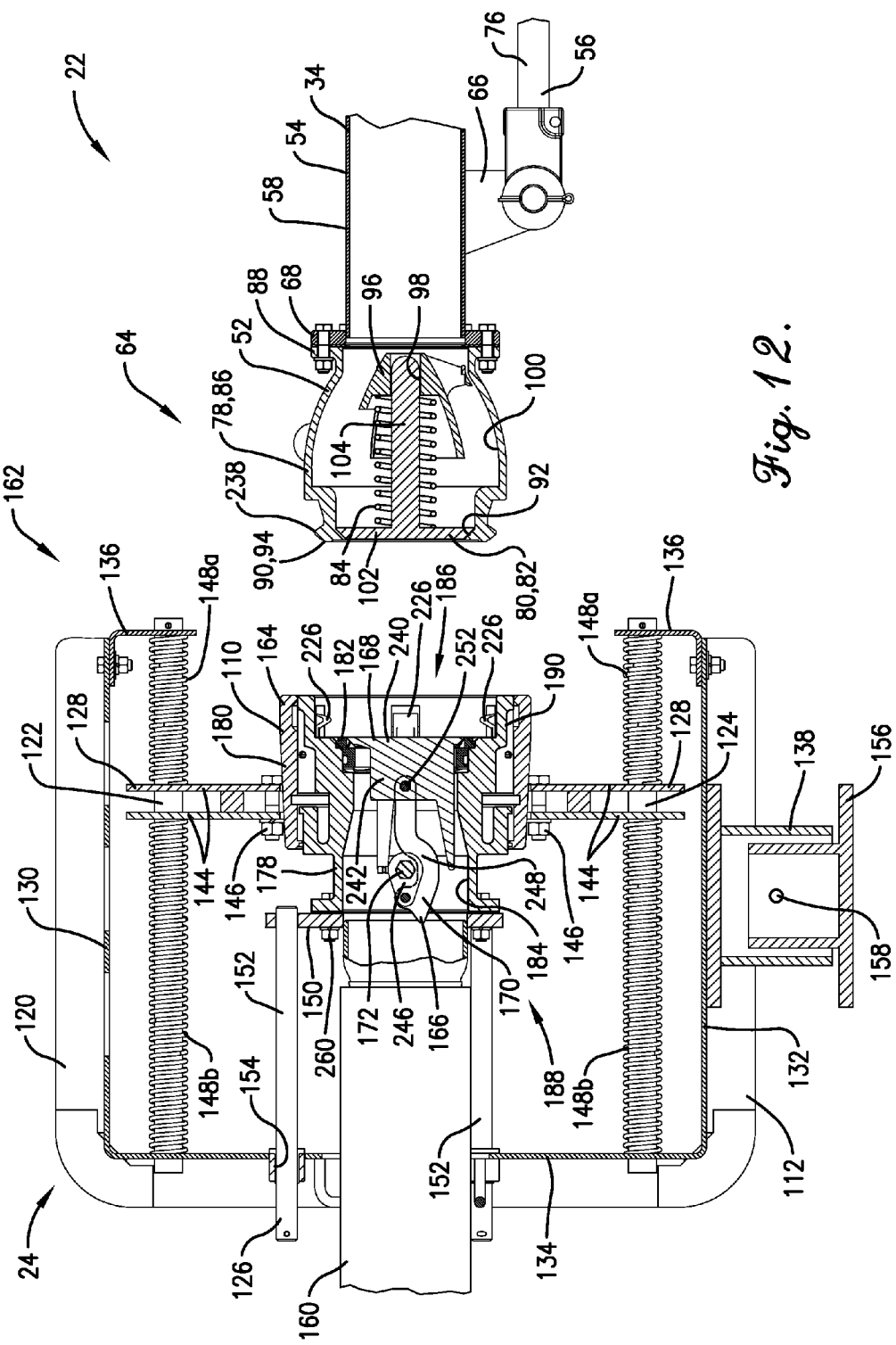
Figure 13:
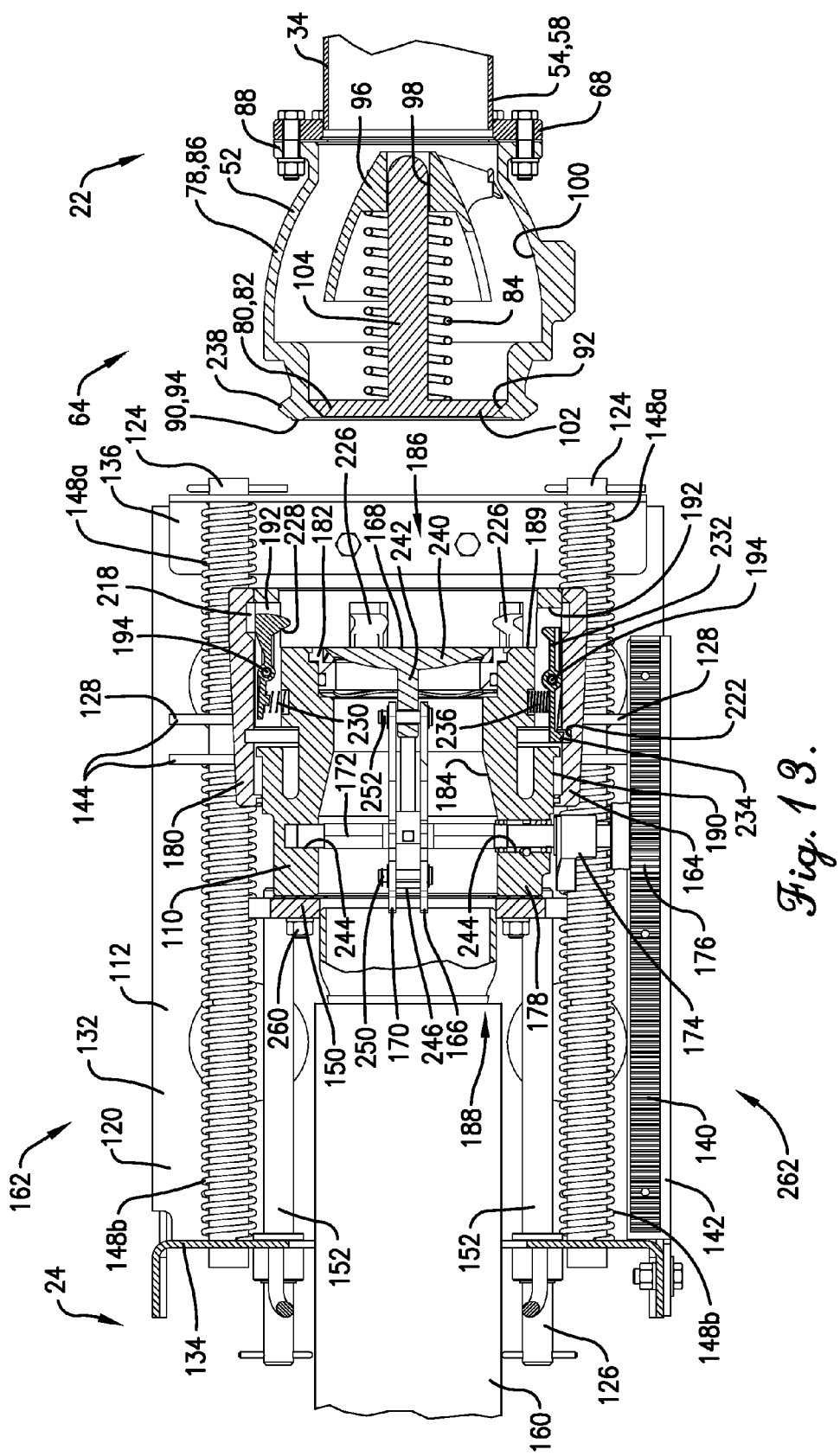
Figure 14:
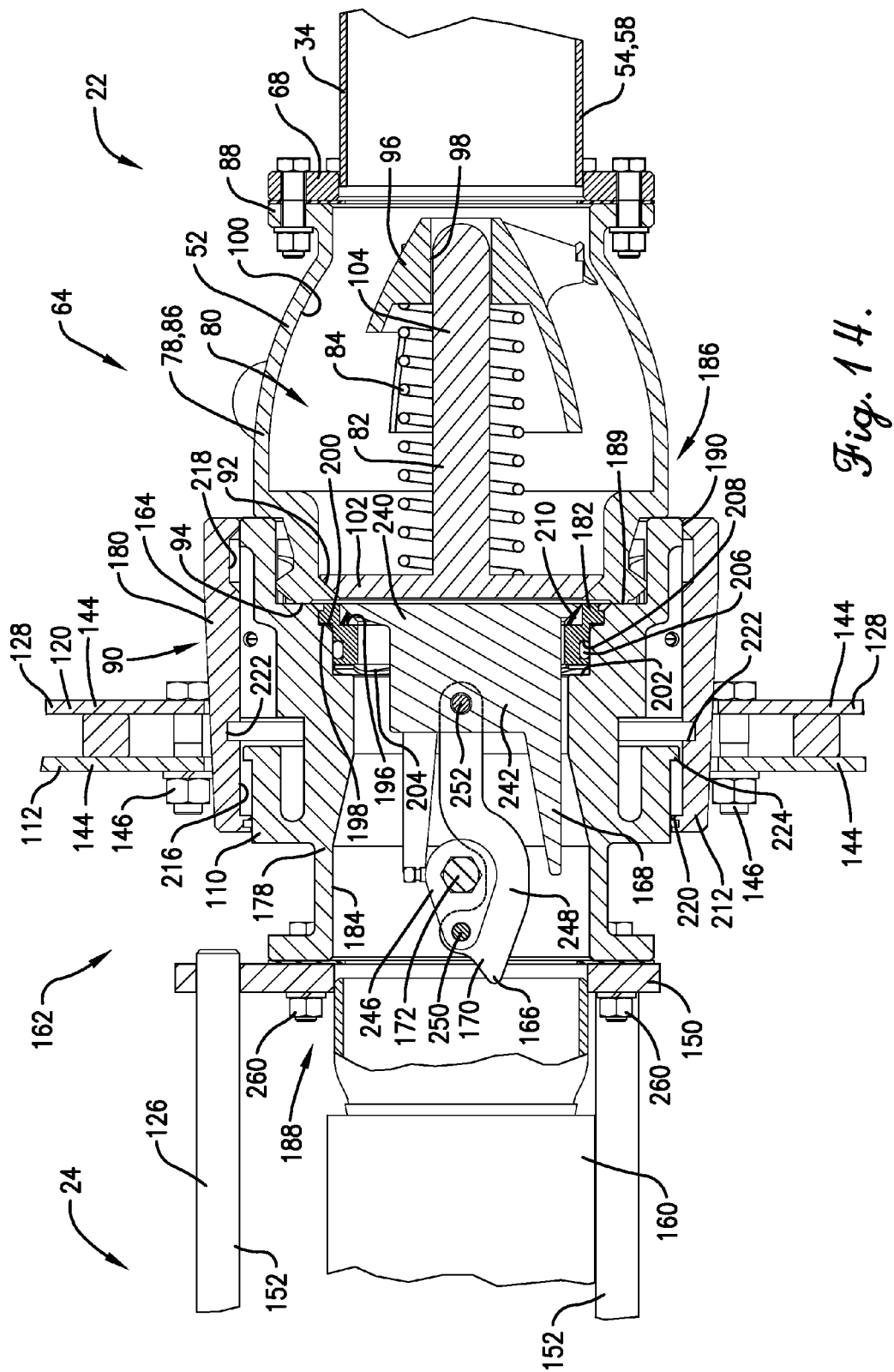
Figure 15:
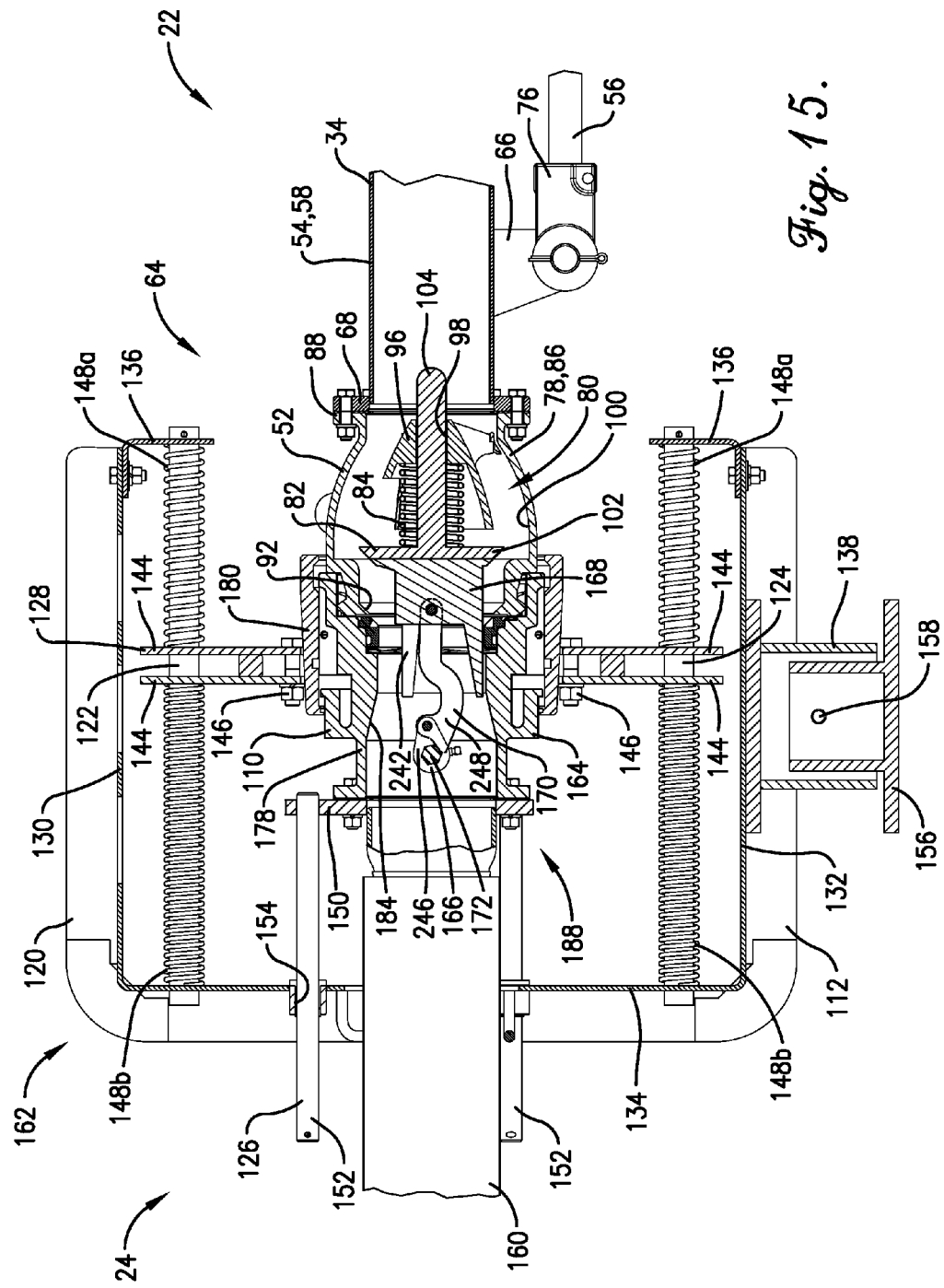
Figure 16:
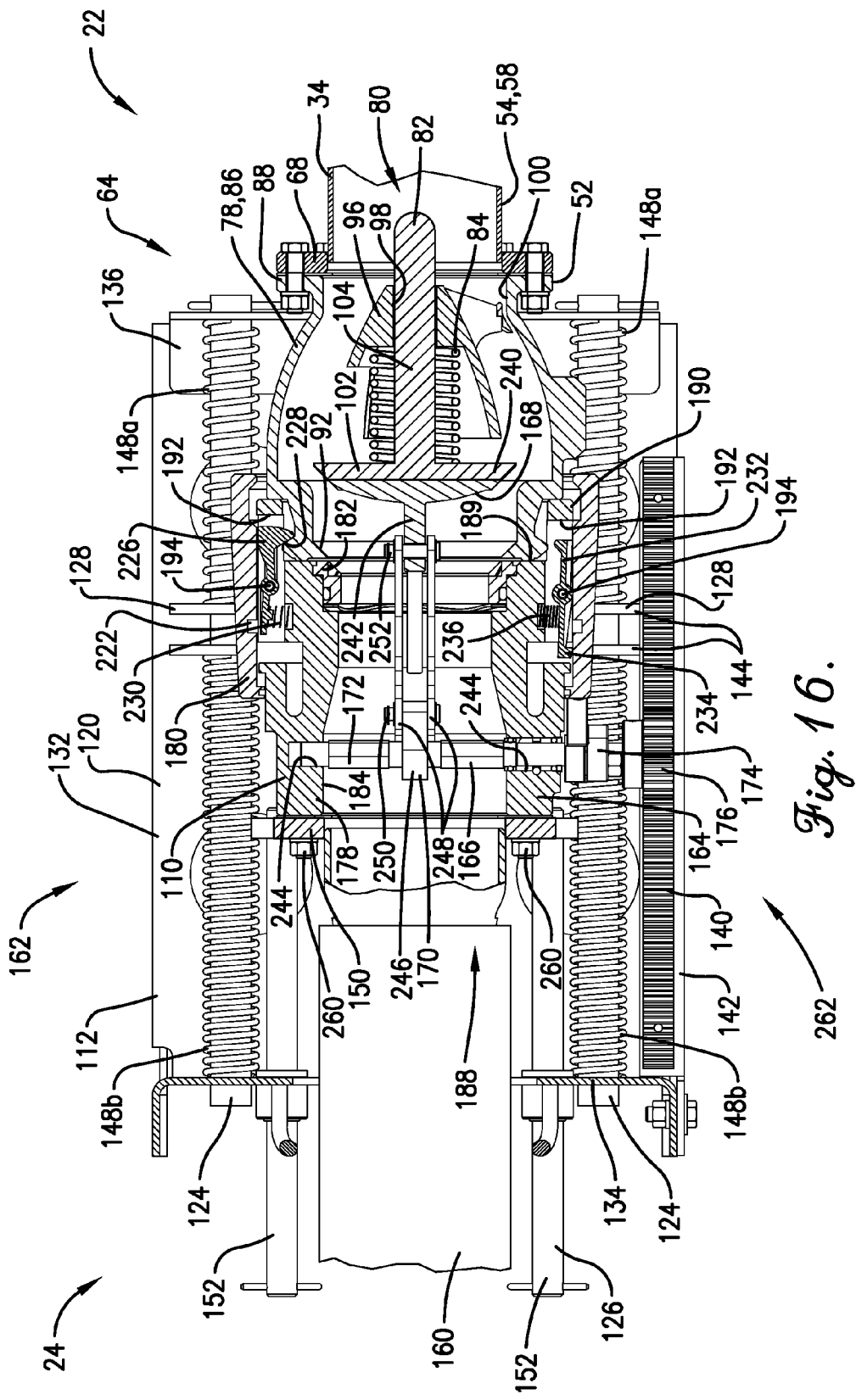

FIG. 6 is a fragmentary rear perspective of the application system depicted in FIGS. 1-5, showing the station connector, valve assembly, and pinion of the female fluid connector assembly, with an outer sleeve of the station connector supported by the frame and shifted into a locked position, the pinion mounted on a shaft of the valve assembly and intermeshing with a rack of the frame, and a cam of the valve assembly mounted on the shaft to shift the outer sleeve into the locked position, and showing the telescopic probe assembly in an extended position and the connection assembly in the fluid transfer configuration;

FIG. 7 is a fragmentary front perspective of the application system depicted in FIGS. 1-6, showing the connection assembly in the fluid transfer configuration, with the frame of the support assembly including springs and brackets that position the outer sleeve of the station connector and urge the female connector assembly to return to a valve-closing position;

FIG. 8 is a fragmentary rear perspective of the application system similar to FIG. 6, but showing the connection assembly in a disengaged configuration associated with the female connector assembly in the valve-closing position, further showing the telescopic probe assembly in a retracted position, and also showing a poppet valve of the valve assembly in a closed position and the outer sleeve in an unlocked position;

FIG. 9 is a fragmentary front perspective of the application system similar to FIG. 7, but showing the connection assembly in the disengaged configuration, with the female connector assembly in the valve-closing position, further showing a housing and a poppet valve of the male connector assembly, with the poppet valve being in a closed position;

FIG. 10 is a fragmentary rear perspective of the female connector assembly and support assembly shown in FIGS. 1-9, with end flanges, proximal springs, and bracket plates of the support assembly being exploded away to show the female fluid connector, and also showing the frame mount exploded away from the frame;

FIG. 11 is an enlarged fragmentary perspective of the female connector assembly and support assembly shown in FIGS. 1-10, showing the outer sleeve in the unlocked position and the valve assembly in the closed position, with the cam and pinion being exploded from the valve assembly;

FIG. 12 is fragmentary right side elevation of the application system depicted in FIGS. 1-10, showing the fluid-transferring connection assembly cross-sectioned, further showing the male connector assembly disengaged from the female connector assembly, with the corresponding poppet valve in the closed position, and showing the female connector assembly in the valve-closing position, with the outer sleeve in the unlocked position and the corresponding poppet valve in the closed position;

FIG. 13 is fragmentary top view of the application system depicted in FIGS. 1-10 and 12, showing the fluid-transferring connection assembly cross-sectioned, with the connector assemblies disengaged and the female connector assembly in the valve-closing position, and also showing a linkage that interconnects the shaft and poppet valve of the valve assembly;

FIG. 14 is an enlarged right side elevation of the application system depicted in FIGS. 1-10, 12, and 13, showing the fluid-transferring connection assembly cross-sectioned, and showing the male connector assembly shifted distally from the disengaged configuration so that the connector assemblies are in sealing engagement with each other, with the female connector assembly being in the valve-closing position;

FIG. 15 is fragmentary right side elevation of the application system depicted in FIGS. 1-10 and 12-14, showing the fluid-transferring connection assembly cross-sectioned, and showing the connector assemblies positioned so that the female connector is shifted distally from the valve-closing position and the connection assembly is shifted into the fluid transfer configuration; and FIG. 16 is a fragmentary top view of the application system depicted in FIGS. 1-10 and 12-15, showing the fluid-transferring connection assembly cross-sectioned, and showing the connection assembly in the fluid transfer configuration, with the valve assembly shifted so that the poppet valve is in the open position.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 1:
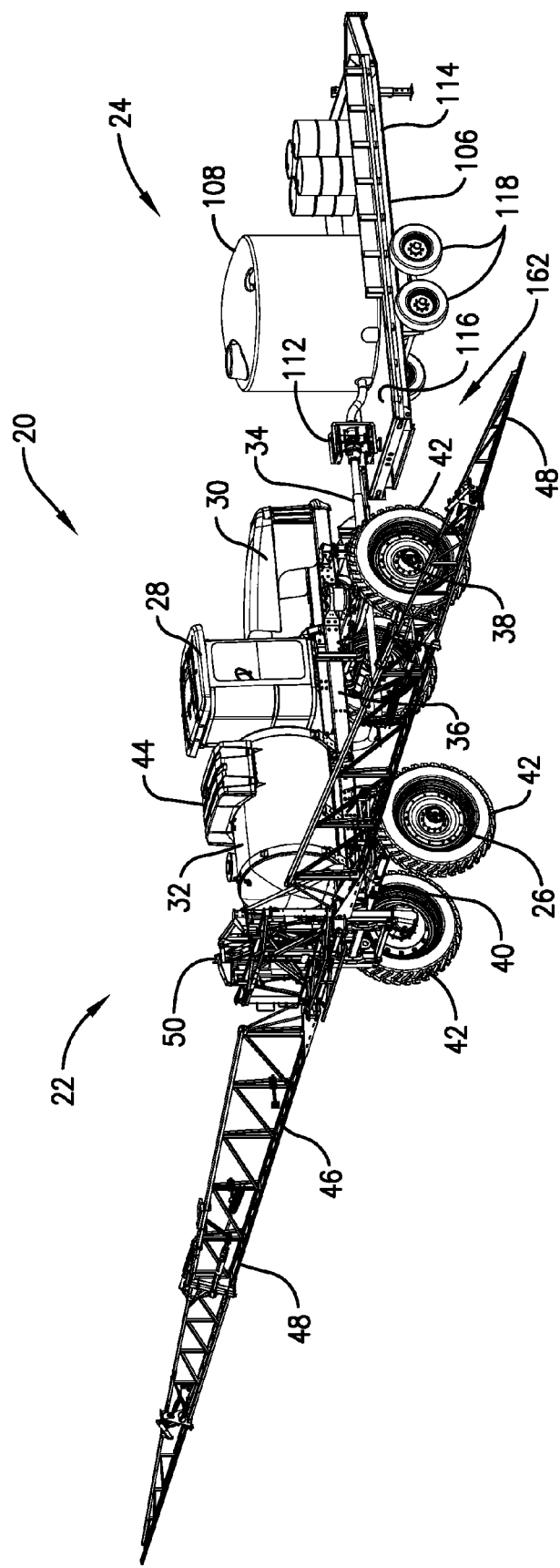

Turning initially FIG. 1, a liquid material application system 20 is operable to distribute liquid materials throughout a crop field (not shown). The system 20 permits efficient transfer of liquid (not shown) between a mobile agricultural applicator 22 and an applicator supply station 24 that serves to refill the applicator 22 with liquid. However, the principles of the present invention are also applicable where the system 20 is used to transfer liquids for other purposes. As will be discussed, the illustrated system 20 preferably permits fluid connection and disconnection between the applicator 22 and station 24 without direct manual contact or manual manipulation of the fluid connectors.

Figure 2:
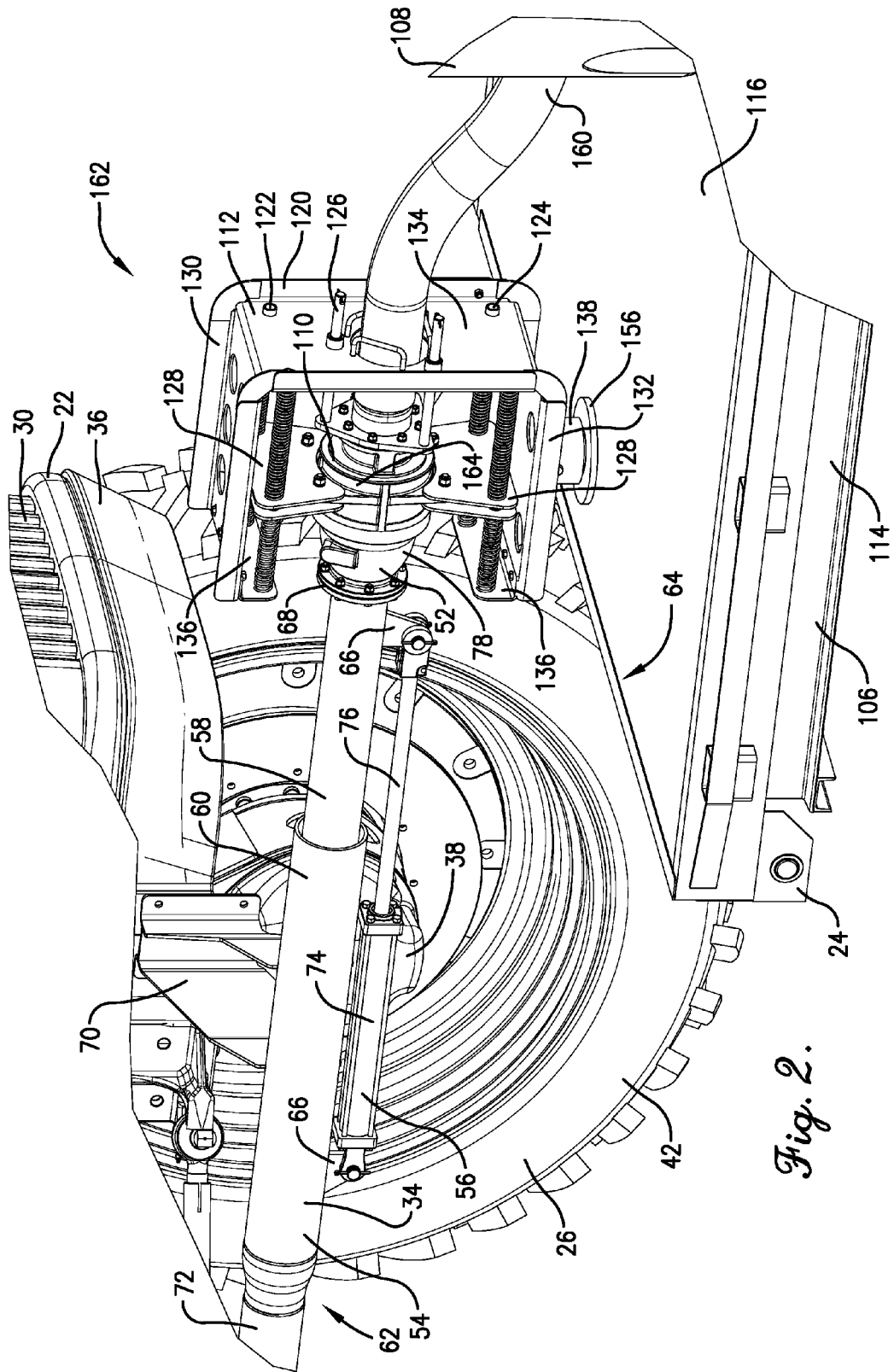
Figure 3:
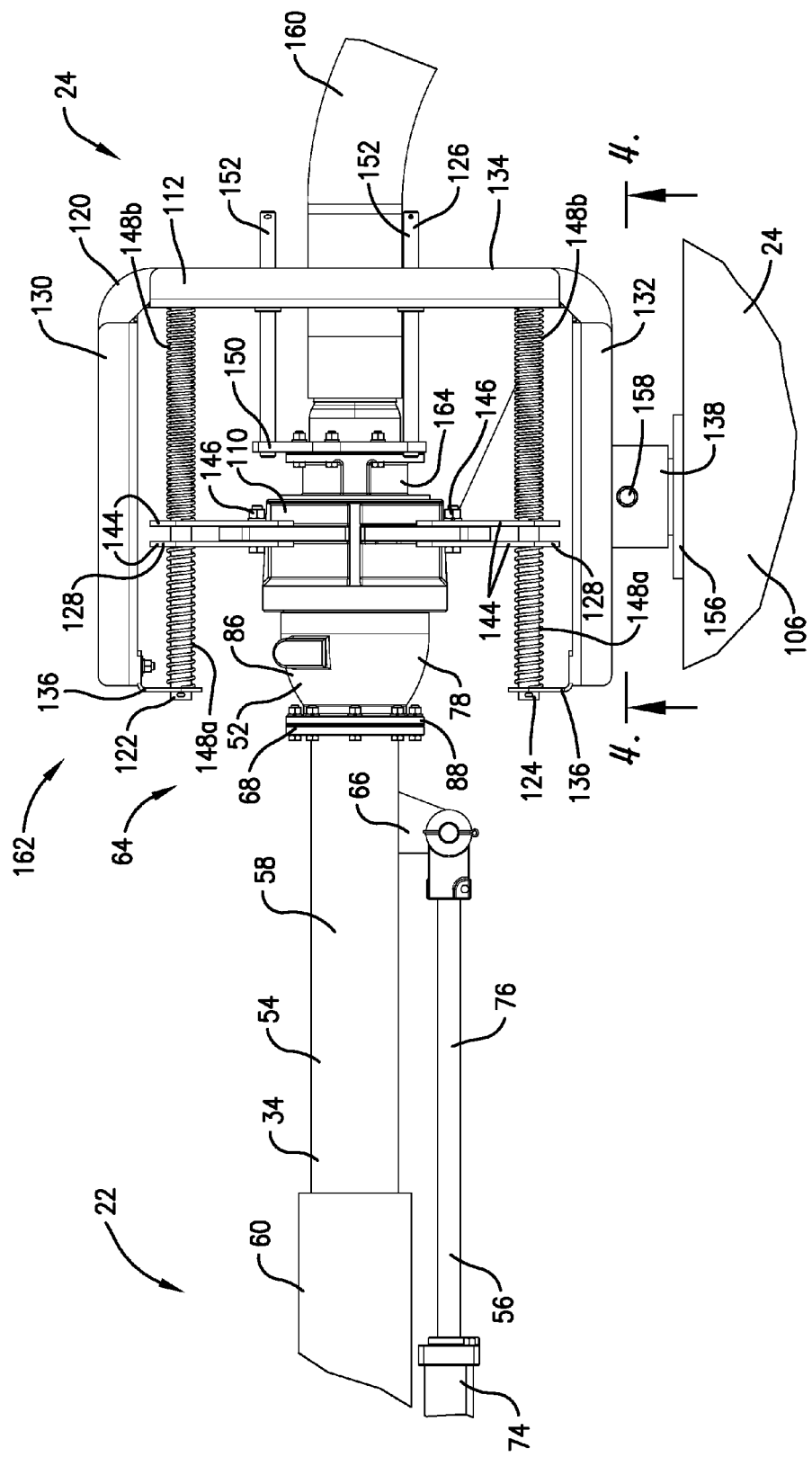
FIG. 3 is a fragmentary side elevation of the application system depicted in FIGS. 1 and 2, showing the connection assembly in the fluid transfer configuration.

Turning to FIGS. 1-3, the illustrated applicator 22 is preferably a dirigible, self-powered vehicle and serves to apply liquid to the crop field. However, it is also within the scope of the present invention where the applicator 22 is alternatively constructed. For instance, the applicator 22 could be mobile but not self-powered (i.e., where the applicator is towed by another vehicle). The applicator 22 preferably includes, among other things, a rolling chassis 26, a cab 28, a hood 30, an engine (not shown), a sprayer assembly 32, and a fluid probe assembly 34. The illustrated chassis 26 preferably comprises an adjustable-height chassis that includes a longitudinally extending frame 36, front and rear axles 38,40 that support the frame 36, and wheels 42 mounted on the axles 38,40. Further details of the preferred height-adjustable chassis 26 are disclosed in U.S. application Ser. No. 12/645,015, filed Dec. 22, 2009 (issued as U.S. Pat. No. 8,042,817 on Oct. 25, 2011), entitled ADJUSTABLE HEIGHT DEVICE FOR HIGH CLEARANCE VEHICLE, which is hereby incorporated in its entirety by reference herein. In the usual manner, the rolling chassis 26 is powered by the engine and serves to support the sprayer assembly 32.

The sprayer assembly 32 preferably serves to distribute liquid material uniformly and preferably includes an applicator tank 44 and boom assembly 46. The tank 44 is conventional and serves to hold liquid material (not shown) in the usual manner. The tank is mounted on the rolling chassis 26 between the boom assembly 46 and cab 28. The boom assembly 46 preferably includes booms 48 and boom support frame 50. The booms 48 are shiftably attached to corresponding ends of the boom support frame 50. The boom assembly 46 supports a plurality of spray nozzles (not shown) and fluid tubing (not shown) that fluidly connects the tank 44 and nozzles. The boom assembly 46 is preferably mounted to the rolling chassis 26 adjacent an aft end of the chassis 26. Thus, as the applicator 22 moves in a forward direction, the sprayer assembly 32 applies liquid material rearwardly of the chassis 26. However, it is also within the ambit of the present invention where the boom assembly 46 is alternatively mounted on the chassis 26, e.g., where the boom assembly 46 is mounted adjacent the fore end of the chassis 26. As is customary, the boom assembly 46 is preferably foldable for transport and when obstacles in the field are encountered.

Turning to FIGS. 1-8, the illustrated fluid probe assembly 34 shiftably supports a male fluid connector assembly 52 of the applicator 22 and serves to fluidly connect the station 24 and the tank 44. As will be discussed, the probe assembly 34 provides an adjustable fluid conduit with a distal end that is mechanically positionable relative to the chassis 26. However, for some aspects of the present invention, the probe assembly 34 could be fixed to the chassis 26. The illustrated fluid probe assembly 34 preferably includes a telescopic fill tube 54 and a hydraulic cylinder 56. The telescopic tube 54 preferably includes inner and outer tube sections 58,60. The tube sections 58,60 each preferably comprise a substantially rigid conduit and present respective proximal and distal ends, with the proximal end of the inner tube section 58 being telescopically received within the outer tube section 60. In this manner, the tube sections 58,60 cooperatively present the fill tube 54, and the fill tube 54 presents proximal and distal ends 62,64 that are shiftable relative to each other. The fill tube 54 also includes weldments 66 attached to corresponding tube sections 58,60 and a flange 68 attached to the inner tube section 58 adjacent to the distal end 64.

The telescopic fill tube 54 is supported on the chassis 26 by a bracket 70 such that the fill tube 54 preferably extends longitudinally along the chassis 26 and extends longitudinally beyond the front end of the applicator 22. However, it is also within the scope of the present invention where the fill tube 54 projects in an alternative direction relative to the chassis 26 (e.g., rearwardly, upwardly, or in a sideward direction). The bracket 70 secures the outer tube section 60 to the chassis 26 and permits the inner tube section 58 to shift along the longitudinal direction. The outer tube section 60 is fluidly attached to a supply conduit 72 that extends from the proximal end 62 in a rearward direction to the tank 44 so that the supply conduit 72 fluidly connects the fill tube 54 and tank 44.

The hydraulic cylinder 56 is conventional and includes a cylinder housing 74 and piston 76 slidably received in the housing 74. The hydraulic cylinder 56 is attached to the telescopic fill tube 54 by attaching the end of the piston 76 to weldment 66 mounted on the inner tube section 58 and attaching an end of the cylinder housing 74 to weldment 66 mounted on the outer tube section 60. The hydraulic cylinder 56 is operably coupled to a hydraulic system (not shown) of the applicator 22 that permits the operator to preferably control the position of the piston 76 from within the cab. Although the fluid probe assembly 34 preferably includes the hydraulic cylinder 56 to shift fill tube 54, it is also within the ambit of the present invention where another drive is employed to position the fill tube 54, e.g., another type of linear motor such as a pneumatic cylinder or a linear electric motor.

Movement of piston 76 in and out of the housing 74 causes corresponding movement of the inner tube section 58 relative to the outer section 60 between an extended position (see FIGS. 6 and 7) and a retracted position (see FIGS. 8 and 9). In this manner, the hydraulic cylinder 56 serves to shift the distal end 64 of the probe assembly 34 along the longitudinal direction relative to the chassis 26. As will be discussed in greater detail, the fore and aft movement of the probe assembly 34 serves to position the distal end 64 for fluid connection to the station 24. In the illustrated embodiment, the probe assembly 34 is also adjustably mounted to provide substantially coaxial alignment between connector assembly 52 and the connector assembly associated with station 24, particularly when the applicator 22 and station 24 are positioned on an uneven surface. For example, the probe assembly 34 is preferably mounted to the chassis 26 with a trunnion mechanism (not shown) that is configured to permit tilting of the probe assembly 34 about a lateral axis and/or pivoting of the probe assembly 34 about a vertical axis. However, the principles of the present invention are equally applicable where the probe assembly 34 is alternatively shiftable relative to the chassis 26 while still providing mechanized connection between the applicator 22 and station 24.

Turning to FIGS. 12-14, the fluid connector assembly 52 is attached to flange 68 and is operable to be connected to a complemental fluid connector assembly of station 24, as will be discussed in greater detail. Fluid connector assembly 52 is normally closed and includes a male connector 78, and a valve assembly 80 that includes a poppet valve 82 and a spring 84. The male connector 78 includes an outer housing 86 that presents a proximal flange end 88 and a distal male connector end 90. The male connector end 90 includes internal and external seats 92,94. The male connector 78 also includes an inner poppet support frame 96 that presents a bore 98. The outer housing 86 and inner poppet support frame 96 cooperatively present a passage 100 that extends continuously between the ends 88,90.

The poppet valve 82 is preferably unitary and includes a head 102 and stem 104. The poppet valve 82 is slidably mounted on the male connector 78. In particular, the stem 104 is slidably received in bore 98, with the spring 84 being positioned between the support frame 96 and head 102. The poppet valve 82 is slidable into and out of a closed position where the head 102 is received by the internal seat 92 and prevents fluid flow through the passage 100 (see FIGS. 12 and 13). The poppet valve 82 is yieldably biased into the closed position by the spring 84. In the closed position, the head 102 presents an endmost face that is preferably adjacent to external seat 94. The spring 84 serves to urge the poppet valve 82 into the closed position. The illustrated connector assembly 52 is preferably a bottom loading adaptor, Model No. 1004D2, manufactured by OPW Engineered Systems, 2726 Henkle Drive, Lebanon, Ohio 45036. While the male connector assembly 52 is preferably installed as part of the applicator 22, it is also within the scope of the present invention where the male connector assembly 52 is installed on the supply station 24.

Turning to FIGS. 1-3, the supply station 24 supplies liquid (such as liquid chemical) periodically to the applicator 22 and, in turn, the liquid is sprayed by the applicator 22 onto the field. The illustrated supply station 24 is preferably mobile, but it is also within the scope of the present invention where the supply station 24 is installed at a location so as to be stationary. The illustrated supply station 24 preferably includes a trailer 106, a storage tank 108, a fluid pump (not shown), a female fluid connector assembly 110, and a connector support assembly 112. Alternatively, the station 24 could position the storage tank 108 sufficiently above the applicator tank 44 to permit gravity supply of the liquid. The trailer 106 is conventional and includes a trailer frame 114, a platform 116 supported on the trailer frame 114, and a pair of wheeled axles 118 that support the frame 114 and platform 116. While the illustrated trailer 106 is preferably towed by another vehicle to and from a supply location, it is also within the scope of the present invention where the station is a self-powered vehicle. The storage tank 108 is a conventional cylindrical liquid container for storing large amounts of liquid, and liquid is selectively pumped out of the tank 108 by a fluid pump (not shown). In the usual manner, the tank 108 includes a removable lid that permits refilling of the tank 108 and presents a lower discharge opening. The illustrated tank 108 is secured on the platform 116 and is positioned longitudinally along the platform 116 adjacent the axles 118.

Turning to FIGS. 2-10, the connector support assembly 112 is configured to support the fluid connector assembly 110. As will be discussed in greater detail, the connector support assembly 112 provides mechanized engagement of the connector assemblies 52,110 such that manual manipulation of the connector assemblies 52,110 is unnecessary. Furthermore, the connector assemblies 52,100 allow the applicator 22 and station 24 to be efficiently coupled and decoupled for selective fluid transfer therebetween.

The support assembly 112 includes, among other things, a support frame 120, upper and lower bracket guide rods 122,124, intermediate connector guide 126, and mounting brackets 128. The support frame 120 is substantially rigid and includes upper and lower wall sections 130,132, and sidewall section 134. The support frame 120 also includes end flanges 136 attached to ends of the upper and lower wall sections 130,132 opposite the sidewall section 134. The support frame 120 additionally includes a bushing 138 attached below the lower wall section 132, and the bushing 138 is configured to mount the support frame 120 on the trailer 106. The support frame 120 further includes a toothed rack 140 and a bracket 142 that supports the rack 140. The bracket 142 is attached to the sidewall section 134, with the bracket 142 and rack 140 extending longitudinally between upper and lower wall sections 130,132. The rack 140 serves to permit opening and closing of valves associated with the connector assemblies 52,110, as will be discussed further.

Turning to FIGS. 8-10, the guide rods 122,124 extend longitudinally and are supported by end flanges 136 and sidewall section 134. The mounting brackets 128 each include two plates 144 secured to each other by fasteners 146. The brackets 142 are slidably mounted on corresponding guide rods 122,124, with proximal and distal springs 148a, 148b received on the guide rods 122,124 and positioned on respective sides of the brackets 142. As will be discussed, the brackets 142 serve to support the fluid connector assembly 110. The connector guide 126 includes a flange 150 and three rods 152 attached to the flange 150. The rods 152 are slidably mounted in corresponding openings 154 of sidewall section 134 such that the flange 150 can slide longitudinally between the upper and lowered wall sections 130,132 (see FIGS. 9 and 12).

Turning to FIGS. 3-5, the support assembly 112 also includes a cylindrical frame mount 156 that presents an opening operable to receive the bushing 138. The frame mount 156 is attached adjacent an aft end of the platform 116 and is connected to the bushing 138 by a fastener 158 to cooperatively provide an adjustable pivot joint. The pivot joint preferably permits relative pivotal adjustment between the bushing 138 and frame mount 156 about a lateral pivot axis so that the connector assembly 110 is freely tiltable relative to the platform 116. The pivot joint is manually adjusted by loosening the nut and bolt of fastener 158. The bushing 138 is then tilted relative to frame mount 156 into a desired tilt orientation and the nut and bolt are tightened. In particular, the support frame 120 can be shifted from an upright orientation (see FIG. 3) to a forwardly tilted orientation (see FIG. 5). The support frame 120 can preferably be tilted either forwardly or rearwardly from the upright orientation to provide automatic mechanized engagement of the connector assemblies 52,110. Specifically, the support frame 120 is preferably tilted relative to platform 116 so that the longitudinal axes of connectors assemblies 52,110 are substantially coaxial as the connector assemblies 52,110 are brought into sealing engagement. Such adjustment is useful when the applicator 22 and supply station 24 are positioned on an undulating surface. It is also within the ambit of the present invention where the pivot joint permits side-to-side movement of the support frame 120 relative to the frame mount 156.

Furthermore, the pivot joint cooperatively presented by support frame 120 and frame mount 156 also preferably permits pivotal movement about an upright pivot axis (see FIG. 4). In particular, the bushing 138 includes holes that present a larger diameter dimension than the fastener 158. Thus, the illustrated pivot joint allows the bushing 138 to be manually rotatably adjusted relative to frame mount 156 by first loosening the nut and bolt of fastener 158. The bushing 138 is then rotated relative to frame mount 156 into a desired position and the nut and bolt are tightened. While the illustrated support assembly 112 permits manual adjustment of support frame position, the principles of the present invention are applicable where the support assembly 112 includes an alternative adjustment mechanism, such as a powered drive, to selectively position the connector assembly 110 relative to the platform 116 for alignment with the connector assembly 52.

Turning to FIGS. 11-16, the fluid connector assembly 110 is fluidly connected to storage tank 108 by a flexible supply tube 160, with the supply tube 160 being received by a fitting attached to the connector guide 126 and extending through an opening in the sidewall section 134. As will be discussed in greater detail, the fluid connector 110 is operable to be removably connected to fluid connector assembly 52 of applicator 22. In particular, the connector assemblies 52,110 and support assembly 112 cooperatively provide a fluid-transferring connection assembly 162 that permits mechanized fluid engagement and disengagement of applicator 22 and supply station 24. The fluid connector assembly 110 preferably includes a female connector 164 and valve assembly 166, with the valve assembly 166 including a poppet valve 168, linkage 170, shaft 172, and cam 174 (see FIGS. 13 and 14). The connector assembly 110 also includes a pinion gear 176 that serves to drive the valve assembly 166, as will be discussed further.

Turning to FIGS. 10-14, the female connector 164 houses the valve assembly 166 and is shiftable into and out of sealing engagement with male connector 78. As will be discussed, the connectors 78,164 are in sealing engagement when the connector assemblies 52,110 are in a fluid transfer configuration. The female connector 164 preferably includes a housing 178, outer sleeve 180 and inner sleeve 182. The housing 178 includes a generally cylindrical body that presents a bore 184 extending between proximal and distal ends 186,188 of the housing 178. The housing 178 presents a seat 189 positioned adjacent the proximal end 186. The housing 178 also presents an outer surface 190 including circumferentially spaced openings 192 that are longitudinally positioned adjacent the proximal end 186 (see FIGS. 13 and 16). The housing 178 further includes pins 194 that are secured to the cylindrical housing body and are transversely positioned within corresponding openings 192.

Turning to FIG. 14, the inner sleeve 182 interconnects and sealingly engages the housing 178 and the poppet valve 168. The inner sleeve 182 is unitary and presents a bore with radially inner and outer sections that extend between proximal and distal ends of the inner sleeve 182. The inner sleeve 182 also presents interior and exterior shoulders 196,198, with the interior shoulder 196 presented by the inner sleeve section and the exterior shoulder 198 presented by the outer sleeve section. The sleeve 182 is inserted in bore 184 of housing 178 adjacent the proximal end 186, with the exterior shoulder 198 being positioned adjacent an outer shoulder 200 presented by the bore 184. Thus, the sleeve and housing 178 cooperatively define a passage through the female connector 164. In addition, the distal end of the sleeve 182 is positioned adjacent an inner shoulder 202 of the bore 184, with a wave spring 204 positioned between the shoulder 202 and distal sleeve end that permits limited relative axial movement between the inner sleeve 182 and housing 178. Furthermore, an o-ring 206 is positioned in an outer o-ring gland 208 of the sleeve 182. Another o-ring 210 is received in engagement with inner shoulder 202 and is configured to receive a complemental sealing surface of the poppet valve 168.

Turning to FIGS. 10, 11, and 14, the outer sleeve 180 is slidably received around housing 178 and serves to selectively lock the male and female connectors 78,164 to each other, as will be discussed in greater detail. Outer sleeve 180 is preferably unitary and includes a generally cylindrical body 212 and oppositely spaced handles 214 that are integrally formed with each other. The body 212 has a bore 216 with a proximal groove 218, an endless distal rib 220, and an intermediate groove 222. The sleeve 180 is slidably received onto housing 178 by inserting the distal end 188 of housing 178 through the proximal end of sleeve 180, with the rib 220 being operable to contact a shoulder 224 of housing 178. As will be discussed further, the sleeve 180 is operable to be shifted between locked and unlocked positions associated respectively with the fluid transfer configuration and an occluded configuration of the fluid-transferring connection assembly 162.

Turning to FIGS. 13 and 16, the female connector 164 also includes five (5) pawls 226 operable to releasably secure the male connector 78 to the housing 178. The pawls each include a hooked end presenting a cam surface 228. The pawls 226 are spaced circumferentially about the housing 178 and are positioned within respective openings 192. Furthermore, the pawls 226 are pivotally mounted on respective pins 194, with the cam surface 228 extending radially inwardly through the corresponding opening 192. Springs 230 are positioned within corresponding openings 192 and engage the pawls 226 to urge the corresponding cam surfaces 228 radially inwardly.

With the sleeve 180 in the unlocked position, the hooked ends of pawls 226 are positioned adjacent proximal groove 218 and are shiftable radially outwardly by springs 230 to be received by the proximal groove 218. With the sleeve 180 in the locked position, the hooked ends of pawls 226 are positioned distally from the proximal groove 218 so that the sleeve 180 restricts pivotal movement of the pawls 226 relative to the housing 178.

The female connector 164 also preferably includes a pair of interlocks 232 that selectively allow the sleeve 180 to shift between the locked and unlocked positions. The interlocks 232 each include a hooked end 234. The interlocks 232 are positioned within corresponding openings 192 of the housing 178 and are pivotally mounted on corresponding pins 194, with the hooked ends 234 facing radially outwardly. Springs 236 are positioned in the corresponding openings 192 and urge the hooked end 234 to extend radially outwardly from the opening 192.

With the sleeve 180 in the unlocked position, the hooked end 234 is urged to be shifted radially outwardly into engagement with the intermediate groove 222 and thereby restricts axial sleeve movement relative to the housing 178. The interlocks 232 are shifted out of engagement with the intermediate grove 222 by inserting the connector assembly 52 into engagement with the connector assembly 110. In particular, the male connector 78 presents an endless outer rib 238 operable to engage a tabbed end of the interlock 232 opposite the hooked end 234. When the connector assemblies 52,110 are in sealing engagement, the interlocks 232 are engaged by the outer rib 238 so that the hooked ends 234 are shifted out of engagement with the groove 222. In this manner, the sleeve 180 is permitted by the interlocks 232 to be shifted from the unlocked position and into the locked position. While the connector assembly 110 preferably includes female connector 164, it is also within the scope of the present invention where the connector assembly includes male connector 78 (e.g., where the applicator 22 includes female connector 164 and support assembly 112). The manner of interconnecting the connectors 78 and 164 may also be varied without departing from the scope of the present invention.

Turning to FIGS. 11-16, the poppet valve 168 selectively prevents fluid flow through the female connector 164 and includes a head 240 and a body 242, with the head 240 presenting a valve surface that engages o-ring 210 and an endmost face. The poppet valve 168 is slidably received in the passage presented by the female connector 164 and is axially shiftable between open and closed valve positions, with the poppet valve 168 preventing fluid flow through the passage when in the closed position. In the closed position, the endmost valve face is preferably substantially coplanar with the seat 189.

The shaft 172 is elongated and is journaled in transverse shaft bore 244 in housing 178. The linkage 170 includes a drive link 246 mounted on the shaft 172 and driven links 248 that interconnect the drive link 246 and poppet valve 168. In particular, the driven links are pivotally attached to the drive link by pin 250 and are also pivotally attached to the poppet valve 168 by pin 252. Thus, rotation of shaft 172 and corresponding movement of linkage 170 is operable to shift the poppet valve 168 between the open and closed positions.

Turning to FIGS. 11-16, the cam 174 includes a body 254 and a roller 256 attached to the body 254, with the body 254 presenting a cam surface 258. The cam 174 is mounted on shaft 172 such that the cam surface 258 permits sleeve 180 to be in the unlocked position when the poppet valve 168 is in the closed position. In particular, with the connector assemblies 52,110 engaged, the cam surface 258 engages the distal end of sleeve 180 and shifts the sleeve 180 into the locked position as the poppet valve 168 is shifted into the open position. The female connector 164 and valve assembly 166 are preferably provided as Bottom Loading Coupler, Model No. 1004D3, manufactured by OPW Engineered Systems, 2726 Henkle Drive, Lebanon, Ohio 45036.

Turning to FIGS. 12-16 the female fluid connector assembly 110 is shiftably mounted to connector support assembly 112 and is shiftable along a longitudinal direction. In particular, brackets 142 are preferably secured to corresponding handles 214 with fasteners 146. Springs 148 are received on corresponding guide rods 122,124 and are positioned on respective sides of the brackets 142 to urge the connector assembly 110 into the valve-closing position, as will be discussed. Furthermore, the housing 178 is preferably attached to flange 150 with fasteners 260 and, thereby, is further supported for shiftable longitudinal movement. The connector assembly 110 is also preferably supported so that the pinion gear 176 is mounted to shaft 172 and intermeshes with toothed rack 140.

The illustrated connector assembly 110 is selectively shiftable into and out of the valve-closing position. With the male fluid connector assembly 52 disengaged from the connector assembly 110, interlocks 232 engage the groove 222 to restrict movement of sleeve 180 relative to the housing 178. Consequently, the locked sleeve 180 restricts cam 174 and shaft 172 from rotating. Because the pinion gear 176 and toothed rack 140 are in intermeshing engagement, the connector assembly 110 is also restricted from shifting longitudinally relative to the support assembly 112.

With the connector assemblies 52,110 in sealing engagement with each other and in the valve-closing position, the outer rib 238 shifts the interlocks 232 out of engagement with the groove 222 to permit movement of sleeve 180, as will be discussed in greater detail. In turn, this permits rotation of cam 174 and shafts 172, and thereby permits longitudinal shifting movement of the connector assembly 110. Thus, the connector assembly 110 can shift distally from the valve-closing position once the connector assemblies 52,110 are positioned in sealing engagement. As the connector assembly 110 is shifted in the distal direction out of the valve-closing position, the pinion gear 176 causes rotation of shaft 172 and cam 174, which shifts the sleeve 180 into the locked position. Furthermore, shifting of connector assembly 110 out of the valve-closing position causes shaft 172 to drive the linkage 170 so that poppet valve 168 is shifted out of the closed position. Thus, poppet valve 168 is shifted out of the closed position once connector assembly 110 is in sealing engagement with connector assembly 52 and is shifted out of the valve-closing position.

The connector assembly 110 is urged by distal springs 148b to shift proximally from the fluid transfer configuration and into the valve-closing position. As the connector assembly 110 shifts proximally into the valve-closing position, the pinion gear 176 rotates the shaft 172, which causes the poppet valve 168 to shift into the closed position while the connector assemblies remain in sealing engagement. Proximal movement into the valve-closing position also rotates the cam 174 out of engagement with sleeve 180. Thus, proximal springs 148a urge the sleeve 180 to return to the unlocked position. Furthermore, once the poppet valve 168 in the closed position, the connector assemblies 52,110 can move out of sealing engagement.

Thus, the support assembly 112 and the pinion gear 176 cooperatively provide a drive assembly 262 to preferably provide automatic shifting of the valve assembly 166 into and out of the closed position (see FIGS. 13 and 16). However, the principles of the present invention are equally applicable where an alternative drive mechanism is used with the connector assemblies 52,110 to provide automatic and mechanized shifting into and out of the fluid transfer configuration. For example, a powered drive, such as a solenoid motor, could be operably coupled to the valve assembly 166 to automatically shift the connectors into and out of the fluid transfer configuration. Furthermore, the support assembly 112 could be alternatively configured to shiftably support the connector assembly 110 adjacent the platform 116.

Turning to FIGS. 6, 7, and 12-16, the applicator 22 and supply station 24 are preferably operable to be automatically fluidly engaged (i.e., where connector assemblies 52,110 are locked in the fluid transfer configuration) by shifting the male fluid connector assembly 52 from a disengaged configuration (see FIGS. 8 and 9) in a distal direction toward the female fluid connector assembly 110 and into sealing engagement with the female fluid connector assembly 110 in the fluid transfer configuration (see FIGS. 6 and 7). This relative movement between connector assemblies 52,110 is preferably provided by shifting the tube section 58 of probe assembly 34 toward the station 24 without moving the applicator 22 (i.e., by controlling the hydraulic cylinder 56). However, such relative movement can also be provided by driving the applicator 22 toward the station 24 or moving the station 24 toward the applicator 22.

As connector assembly 52 is shifted into sealing engagement with connector assembly 110, the connector assembly 110 remains in the valve-closing position. The rib 238 preferably serves as a catch and presents a cam surface that is automatically releasably engaged by cam surface 228 of pawls 226. Thus, the pawls 226 releasably engage the rib 238 so that connectors 78,164 are releasably interconnected. Once the connector assemblies 52,110 are in sealing engagement, the poppet valves 82,168 can be opened.

With the connector assemblies 52,110 in sealing engagement, the poppet valves 82,168 are preferably positioned with endmost faces adjacent to each other. As discussed above, poppet valve 168 is opened provided that the connector assembly 110 is in sealing engagement with connector assembly 52 and is shifted out of the valve-closing position. The poppet valve 82 of connector assembly 52 opens when the endmost face of poppet valve 168 engages the corresponding endmost face of poppet valve 82 and shifts the poppet valve 82 open. Thus, the illustrated connector assemblies are constructed so that poppet valves 82,168 open once the connectors are in sealing engagement.

The rib 238 also shifts the interlocks 232 out of engagement with groove 222. Once the interlocks 232 are disengaged from sleeve 180, further distal movement of connector assembly 52 (where "distal" movement refers to movement away from the applicator 22 and "proximal" movement refers to movement toward the applicator 22) causes connector assembly 110 to shift distally out of the valve-closing position. Thus, pinion gear 176 causes shaft 172 to rotate and thereby shift the poppet valve 168 open, with the sleeve 180 being shifted into the locked position. Although the connector assemblies 52,110 are preferably shifted into the fluid transfer configuration by distal movement of the connector assembly 52 out of the valve-closing position, the connection assembly 162 could be alternatively configured to be shifted into the fluid transfer configuration. As discussed above, the support assembly 112 could include a powered drive operably coupled to the valve assembly 166 to shift the poppet valve 168 open and the sleeve 180 into the locked position.

While being shifted into the open position, the endmost face of poppet valve 168 engages the corresponding endmost face of poppet valve 82 of connector assembly 52 and shifts the poppet valve 82 into the open position. Thus, the connector assembly 110 and support assembly 112 are preferably operable to shift the poppet valve 82 open when the connector assembly 52 urges the connector assembly 110 into the fluid transfer configuration. In this manner, the poppet valves 82,168 are automatically shifted out of the closed position and the connector assemblies 52,110 are correspondingly shifted automatically into the fluid transfer configuration. However, for some aspects of the present invention, the poppet valve 82 could be shifted into the open position by a mechanism other than the connector assembly 110 and support assembly 112. For instance, the connector assembly 52 could include a valve assembly similar to valve assembly 166, and the applicator 22 could include a support assembly similar to support assembly 112 for driving the valve assembly and poppet valve 82.

Again, shifting of the connector assembly 110 out of the valve-closing position causes the cam 174 to rotate and shift the sleeve into the locked position. With the sleeve 180 in the locked position, the proximal groove 218 is spaced proximally from the pawls 226 such that the pawls 226 are restricted from pivoting out of engagement with the rib 238. In this manner, the male and female connectors 78,164 are automatically releasably interlocked with one another and are in sealing engagement.

Similarly, the applicator 22 and supply station 24 are operable to be automatically fluidly disengaged by shifting the male fluid connector assembly 52 in a proximal direction away from the female fluid connector assembly 110 and out of sealing engagement with the female fluid connector assembly 110. This movement is preferably provided by shifting the tube section 58 of probe assembly 34 away from the station 24 without moving the applicator 22 (i.e., by controlling the hydraulic cylinder 56).

As connector assembly 52 is initially shifted in a proximal direction out of the fluid transfer configuration, the connectors 78,164 remain releasably locked in sealing engagement. The connector assembly 52 is preferably shifted proximally out of the fluid transfer configuration by driving the hydraulic cylinder 56 of the fluid probe assembly 34 so that the inner tube section 58 shifts proximally relative to the outer tube section 60. However, it is also within the scope of the present invention where the connector assembly 52 is shifted out of the fluid transfer configuration by driving the entire applicator 22 in the proximal direction away from the supply station 24 or shifting the supply station 24 distally away from the applicator 22 to shift the connector assemblies 52,110 out of the fluid transfer configuration.

As the connector assemblies 52,110 move proximally relative to support assembly 112, the pinion gear 176 causes shaft 172 to rotate and thereby shift the poppet valve 168 into the closed position. Consequently, the spring 84 of connector assembly 52 urges the poppet valve 82 to also return to the closed position. Furthermore, the pinion gear 176 causes the cam 174 to rotate out of engagement with the distal end of the sleeve 180. As the connector 164 approaches the valve-closing position, the sleeve 180 is urged from the locked position to the unlocked position by proximal springs 148a. In this manner, the poppet valves 82,168 are automatically shifted into the closed position while the connectors remain sealed and the connector assemblies 52,110 are correspondingly shifted automatically out of the fluid transfer configuration. Once the poppet valves 82,168 are closed, the connectors can shift out of sealing engagement.

In the valve-closing position, the sleeve 180 returns to the unlocked position, and the interlocks 232 are urged by springs 236 to pivot so that the hooked ends 234 engage the groove 222. In addition, the proximal groove 218 returns to a position adjacent the hooked ends of pawls 226, and the pawls 226 are operable to be pivoted out of engagement with rib 238.

Proximal movement of the connector assembly 52 out of sealing engagement with connector assembly 110 preferably occurs by driving the hydraulic cylinder 56 so that the inner tube section 58 shifts proximally relative to the outer tube section 60 (see FIGS. 8 and 9). Again, for some aspects of the present invention, the connector assemblies 52,110 could be shifted out of sealing engagement by driving the entire applicator 22 in the proximal direction away from the supply station 24 or shifting the supply station 24 distally from the applicator 22. As connector assembly 52 is shifted proximally out of the valve-closing position, the rib 238 urges the cam surface 228 of pawls 226 in a radially outward direction until the male connector 78 becomes disengaged from the female connector 164. The proximal springs 148a preferably urge the female connector 164 to remain adjacent the valve-closing position as the connector assembly 52 is shifted out of sealing engagement.

As the connector assemblies are shifted out of sealing engagement, the poppet valves 82,168 remain in the closed position. The closed poppet valves 82,168 are preferably positioned adjacent to ends of the connectors 78,164 so that the heads of poppet valves 82,168 are adjacent to each other when the connectors 78,164 are in sealing engagement. In this manner, any space between the poppet valves 82,168 that could collect liquid during the liquid transfer process is substantially eliminated. Consequently, the connector assemblies are constructed to restrict liquid spillage, particularly when the connector assemblies are shifted out of sealing engagement with each other.

While the illustrated probe assembly 34 is preferably associated with the applicator 22 and the support assembly 112 is preferably associated with the supply station 24 to provide selective fluid connection, it is also within the scope of the present invention where the applicator 22 and supply station 24 are alternatively configured. For example, the applicator 22 could include the support assembly 112 and connector assembly 110, with the supply station 24 including the probe assembly 34 and connector assembly 52.

In operation, the applicator 22 dispenses liquid material along a field until little or no liquid remains in the tank 44, or the applicator 22 is conveniently located at or near a supply station. The applicator 22 is refilled by driving the applicator 22 into a position adjacent the supply station 24 so that the connector assemblies 52,110 can be positioned in sealing engagement with each other. In particular, the connector assembly 52 can be shifted into sealing engagement by driving the applicator 22 toward the supply station 24 or shifting the probe assembly 34 toward the supply station 24. Once in sealing engagement, the connection assembly 162 permits the connector assembly 52 to be further shifted in the distal direction from the valve-closing position until the connection assembly is in the fluid transfer configuration. While in the fluid transfer configuration, liquid can be pumped from the tank 108 through the connection assembly 162, the probe assembly 34, the supply conduit 72, and into the tank 44.

Once transfer of liquid into the tank 44 is complete, the connection assembly 162 is shifted out of the fluid transfer configuration by retracting the connector assembly 52 until the connector assemblies 52,110 return to the valve-closing position. In the valve-closing position, the connector assemblies 52,110 are unlocked and the corresponding poppet valves are closed. Thus, the connector assembly 52 can be shifted out of sealing engagement with the connector assembly 110, and the applicator 22 can return to the field to continue applying liquid material.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An agricultural liquid material application system comprising:
    a mobile agricultural applicator including a chassis and a liquid material applicator tank supported on the chassis; and
    a fluid-transferring connection assembly being operable to selectively define a fluid passage that intercommunicates the applicator tank and a liquid material source when the connection assembly is in a fluid transfer configuration,
    said fluid-transferring connection assembly including a pair of complemental fluid connectors, a first one of which is configured for association with the liquid material source and a second one of which is associated with the applicator,
    said fluid connectors being moveable into and out of sealing engagement to restrict fluid from leaking out of the connection assembly when in the fluid transfer configuration,
    said connection assembly including at least one shiftable valve yieldably biased into a closed position in which flow through the fluid passage is prevented,
    said valve being operably coupled to a corresponding one of the fluid connectors so as to be automatically shifted out of the closed position when the connectors are in sealing engagement with one another and the connection assembly is in the fluid transfer configuration,
    said valve being shifted out of the closed position after the connectors are moved into sealing engagement with one another and being shifted into the closed position before the connectors are moved out of sealing engagement with one another,
    said corresponding one of the fluid connectors being shiftable into and out of a valve-closing position, with the fluid connectors being in sealing engagement and relatively fixed to one another when the corresponding one of the fluid connectors is out of the valve-closing position,
    said valve and corresponding one of the fluid connectors being operably coupled so that shifting of the corresponding one of the fluid connectors causes shifting of the valve, with the valve being shifted out of the closed position once the corresponding one of the fluid connectors has shifted out of the valve-closing position,
    said corresponding one of the fluid connectors being yieldably biased into the valve-closing position,
    said connection assembly including a drive interconnecting the corresponding one of the fluid connectors and the valve so that shifting movement of the corresponding one of the fluid connectors powers the valve into and out of the closed position,
    said drive including a rotatable shaft and a linkage that drivingly interconnects the shaft and valve, with rotation of the shaft causing shifting of the valve into and out of the closed position,
    said drive including a support frame that shiftably supports the corresponding one of the connectors,
    said drive including a driven element mounted on the shaft and a drive element attached to the support frame and drivingly connected to the driven element.

2. The agricultural liquid material application system as claimed in claim 1; and
    a material supply station including a liquid material storage tank, with the supply station serving as the liquid material source and the first connector being associated with the supply station so that the fluid-transferring connection assembly selectively defines the fluid passage between the tanks,
    said fluid connectors being relatively moveable into and out of sealing engagement as a result of relative movement between the applicator and supply station.

3. The agricultural liquid material application system as claimed in claim 2,
    said corresponding one of the fluid connectors being contacted and forcibly shifted out of the valve-closing position by the other fluid connector when the connection assembly is in the fluid transfer configuration, with relative movement between the applicator and supply station causing shifting of the valve out of the closed position.

4. The agricultural liquid material application system as claimed in claim 1,
    said driven element comprising a pinion gear and said drive element comprising a toothed rack,
    said pinion gear and said toothed rack being drivingly intermeshed so that movement of the corresponding one of the connectors relative to the support frame causes rotation of the shaft and thereby shifts the valve.

5. The agricultural liquid material application system as claimed in claim 1,
    said connection assembly including a second valve yieldably biased into a shut position in which flow through the fluid passage is prevented,
    said second valve being operably coupled to the other fluid connector so as to be automatically shifted out of the shut position when the connectors are in sealing engagement with one another and the connection assembly is in the fluid transfer configuration.

6. The agricultural liquid material application system as claimed in claim 5, said second valve being controlled by the first-mentioned valve, with shifting movement of the first-mentioned valve into and out of the closed position causing corresponding movement of the second valve into and out of the shut position.

7. The agricultural liquid material application system as claimed in claim 1,
   said connection assembly including a spring-biased latch mechanism operable to releasably lock the fluid connectors to one another and restrict relative movement therebetween when the fluid connectors are in sealing engagement.

8. The agricultural liquid material application system as claimed in claim 7,
   said spring-biased latch mechanism including a spring-biased shiftable pawl on one of the fluid connectors and a complemental catch on the other fluid connector,
   said pawl and catch having corresponding cam surfaces to permit automatic latching and unlatching of the mechanism.

9. The agricultural liquid material application system as claimed in claim 8,
   said connection assembly including a locking element shiftable into and out of a locked position associated with the fluid transfer configuration to releasably lock the pawl and thereby restrict unlatching movement of the pawl.

10. The agricultural liquid material application system as claimed in claim 9,
    said locking element comprising a sliding sleeve of one of the fluid connectors,
    said one of the fluid connectors including a connector housing, with the sleeve being slidably mounted on the housing to shift axially relative to the housing into and out of the locked position.

11. A fluid-transferring connection assembly for fluid transfer between liquid material tanks of a mobile agricultural applicator and a liquid material supply station, with the connection assembly operable to selectively intercommunicate the tanks when the assembly is in a fluid transfer configuration, said fluid-transferring connection assembly comprising:
    a pair of complemental fluid connectors operable to selectively define a fluid passage that fluidly communicates the tanks in the fluid transfer configuration, a first one of which is configured for association with the liquid material supply station and a second one of which is configured for association with the applicator,
    said fluid connectors being moveable into and out of sealing engagement to restrict fluid from leaking out of the connection assembly when in the fluid transfer configuration,
    said connection assembly including at least one shiftable valve yieldably biased into a closed position in which flow through the fluid passage is prevented; and
    a drive interconnecting a corresponding one of the fluid connectors and the valve,
    said corresponding one of the fluid connectors being shiftable into and out of a valve-closing position, with the fluid connectors being in sealing engagement and relatively fixed to one another when the corresponding one of the fluid connectors is out of the valve-closing position,
    said drive automatically shifting the valve into and out of the closed position in response to shifting movement of the corresponding one of the fluid connectors into and out of the valve-closing position,
    said drive including a rotatable shaft and a linkage that drivingly interconnects the shaft and valve, with rotation of the shaft causing shifting of the valve into and out of the closed position,
    said drive including a support frame that shiftably supports the corresponding one of the connectors,
    said drive including a driven element mounted on the shaft and a drive element attached to the support frame and drivingly connected to the driven element.

12. The fluid-transferring connection assembly as claimed in claim 11,
    said driven element comprising a pinion gear and said drive element comprising a toothed rack,
    said pinion gear and said toothed rack being drivingly intermeshed so that movement of the corresponding one of the connectors relative to the support frame causes rotation of the shaft and thereby shifts the valve.

13. The fluid-transferring connection assembly as claimed in claim 11,
    said connection assembly including a second valve yieldably biased into a shut position in which flow through the fluid passage is prevented,
    said second valve being operably coupled to the other fluid connector so as to be automatically shifted out of the shut position when the connectors are in sealing engagement with one another and the connection assembly is in the fluid transfer configuration.

14. The fluid-transferring connection assembly as claimed in claim 13,
    said second valve being controlled by the first-mentioned valve, with shifting movement of the first-mentioned valve into and out of the closed position causing corresponding movement of the second valve into and out of the shut position.

15. The fluid-transferring connection assembly as claimed in claim 11; and
    a spring-biased latch mechanism operable to releasably lock the fluid connectors to one another and restrict relative movement therebetween when the fluid connectors are in sealing engagement.

16. The fluid-transferring connection assembly as claimed in claim 15,
    said spring-biased latch mechanism including a spring-biased shiftable pawl on one of the fluid connectors and a complemental catch on the other fluid connector,
    said pawl and catch having corresponding cam surfaces to permit automatic latching and unlatching of the mechanism.

17. The fluid-transferring connection assembly as claimed in claim 16; and
    a locking element shiftable into and out of a locked position associated with the fluid transfer configuration to releasably lock the pawl and thereby restrict unlatching movement of the pawl.

18. The fluid-transferring connection assembly as claimed in claim 17,
    said locking element comprising a sliding sleeve of one of the fluid connectors,
    said one of the fluid connectors including a connector housing, with the sleeve being slidably mounted on the housing to shift axially relative to the housing into and out of the locked position.

19. The fluid-transferring connection assembly as claimed in claim 11,
    said fluid connectors being first brought into sealing engagement by relative shifting toward one another, said corresponding one of the fluid connectors being shifted out of the valve-closing position by shifting the sealed fluid connectors with each other relative to the drive.

* * * * *